US012541367B2

(12) United States Patent
Bhojaraja et al.

(10) Patent No.: US 12,541,367 B2
(45) Date of Patent: Feb. 3, 2026

(54) PROCESSING FOR PROCESSORS PERFORMING TASKS HAVING FORWARD CONDITIONAL BRANCH INSTRUCTIONS

(71) Applicant: MICROSOFT TECHNOLOGY LICENSING, LLC, Redmond, WA (US)

(72) Inventors: Dushyanth Bhojaraja, Fremont, CA (US); Prerana Satish Maslekar, San Jose, CA (US); Dennis Clayton Lou, Los Altos, CA (US); Khary Jason Alexander, Cedar Park, TX (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/769,206

(22) Filed: Jul. 10, 2024

(65) Prior Publication Data

US 2026/0017052 A1     Jan. 15, 2026

(51) Int. Cl.
*G06F 9/30* (2018.01)
*G06F 9/38* (2018.01)
*G06F 9/48* (2006.01)

(52) U.S. Cl.
CPC ........ *G06F 9/30058* (2013.01); *G06F 9/3861* (2013.01); *G06F 9/4881* (2013.01)

(58) Field of Classification Search
CPC .................................................. G06F 9/30058
See application file for complete search history.

(56) References Cited

U.S. PATENT DOCUMENTS

| 5,832,260 A | 11/1998 | Arora | |
|---|---|---|---|
| 2004/0103410 A1* | 5/2004 | Sakai | G06F 9/30087 712/E9.032 |
| 2007/0288730 A1 | 12/2007 | Luick | |
| 2018/0173534 A1* | 6/2018 | Peled | G06F 9/3844 |
| 2020/0301877 A1* | 9/2020 | Gupta | G06F 9/3836 |
| 2023/0100693 A1* | 3/2023 | Gupta | G06F 9/3844 712/205 |

OTHER PUBLICATIONS

Extended European Search Report Received for PCT Application No. 25186877.4, Dec. 15, 2025, 11 Pages.

* cited by examiner

*Primary Examiner* — Michael J Metzger

(74) *Attorney, Agent, or Firm* — Shook, Hardy & Bacon L.L.P.

(57) ABSTRACT

Various embodiments described herein control circuitry of a computing device to invalidate certain data elements associated with a forward conditional branch instruction (FCBI) to prevent computational inefficiencies, such pipeline flush. The data elements that are invalidated may correspond to conditional code associated with an FCBI. To make FCBIs more efficient, certain embodiments continue with a not-taken path that is invalidated if a branch resolves to be taken. This results in efficiencies because either the prediction was correct; or when the wrong path is taken, the wrong path is invalidated, thereby avoiding any resource utilization in redirection. In this manner, the FCBI may be executed more quickly or efficiently because certain data elements, such as the conditional code, are invalidated. Accordingly, certain embodiments improve computational inefficiencies, enhance performance of complex computational workloads with certain branches, and reduce or altogether eliminate pipeline stall and flushing for certain workloads.

20 Claims, 12 Drawing Sheets

PROCESSING FOR PROCESSORS PERFORMING TASKS HAVING FORWARD CONDITIONAL BRANCH INSTRUCTIONS

BACKGROUND

Performing computations, workloads, or tasks in a distributed environment, such as a "cloud computing system" or the "cloud," generally represents a transformative paradigm in computing that leverages the power of remote data centers to perform complex computing tasks. An example of complex computing workloads or tasks includes those associated with artificial intelligence (AI). Accessibility to AI has been facilitated by the widespread adoption of the cloud, which has evolved in response to the increasing demand for computational resources that exceeds the computational resources available on individual devices running locally on-premises. Recent widespread adoption of AI-related tasks has caused the demand for computational resources provided by certain distributed environments to increase. For example, executing AI-based tasks includes processing raw data, initializing AI models, iteratively training the AI models, validating the AI models, deploying the trained and validated AI models, and performing inferences associated with user requests made against these deployed AI models. The quantity and complexity of certain AI-based tasks, sometimes executed with if-else statements, ternary operators, do-while loops, for-loops, while-loops, and the like, contain certain computational inefficiencies, the improvement of which is difficult to achieve.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Various embodiments described herein control circuitry of a computing device to invalidate certain data elements associated with a forward conditional branch instruction to prevent computational inefficiencies, such as those associated with pipeline flush. In some embodiments, the data elements that are invalidated correspond to conditional code associated with the forward conditional branch instruction. In one embodiment, these data elements are invalidated when the forward conditional branch instruction is taken and based on a determination that a positive offset of the forward conditional branch instruction is less than or equal to an offset threshold value. In this manner, the forward conditional branch instruction may be executed with less code and more quickly or efficiently because certain data elements, such as the conditional code, are invalidated. Accordingly, certain embodiments improve computational inefficiencies, enhance performance of workloads with certain branches, and reduce or altogether eliminate pipeline stall and flushing for certain workloads.

The present disclosure provides one or more technical solutions that have technical effects in light of various technical problems. Particular embodiments have the technical effect of improved lifespan and operation of hardware components by reducing inefficiencies that manifest when pipeline flushing occurs. Instead, certain embodiments avoid pipeline flushing by invalidating the conditional code that would otherwise cause pipeline flushing in the case of a misprediction. Further, particular embodiments have the technical effect of saving power and improving computational efficiency in performing computationally expensive operations, such as those associated with performing certain tasks, such as any suitable computing tasks including AI-based tasks. For example, certain embodiments perform a forward conditional branch instruction with less code because the invalidated code is not committed in a write-back stage of the pipeline. Additionally, certain embodiments have the technical effect of increasing scalability, allowing computing systems to enforce dozens, hundreds, thousands, or even millions of tasks, having many dependencies and forward conditional branch instructions. In this manner, certain AI-based workloads, neural network training operations, neural network inference operations, and other neural network operations can be performed more efficiently in fewer clock cycles as compared to certain existing approaches.

BRIEF DESCRIPTION OF THE DRAWINGS

The present disclosure is described in detail below with reference to the attached drawing figures, wherein.

DETAILED DESCRIPTION

Figure 1A:
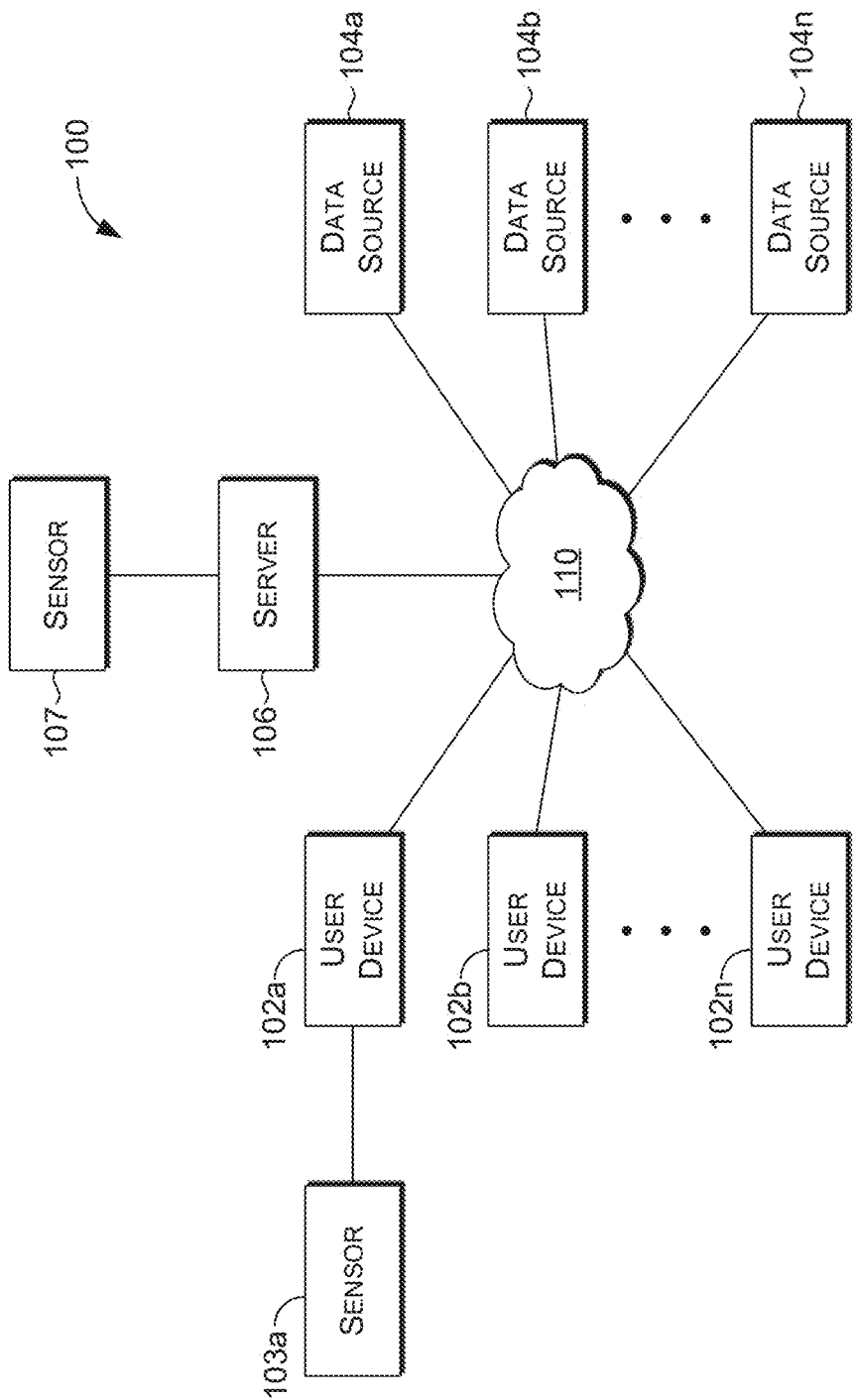
FIG. 1A is a block diagram of an example operating environment suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Embodiments of the technology described herein dynamically control circuitry of a processor and/or accelerator to invalidate certain data elements associated with a forward conditional branch instruction to prevent computational inefficiencies, such as those associated with pipeline flush. Example forward conditional branch instructions include conditional code and forward code. In some embodiments, the data elements that are invalidated correspond to the conditional code associated with the forward conditional branch instruction. In one example, "data element" or "data elements" refers to instructions, such as the instructions contained in the forward conditional branch instructions, the conditional code, the forward code, or any other code described herein. Example data elements are embodied as alpha-numeric characters or any other data structure capable of instructing a computer to perform operations.

In one embodiment, these data elements are invalidated when the forward conditional branch instruction is taken. Certain data elements corresponding to the positive offset are invalidated in response to certain conditions. For example, the data elements are invalidated based on determining that the positive offset is less than or equal to an offset threshold value and/or based on determining that the forward conditional branch instruction is taken. In this manner, the forward conditional branch instruction may be executed with less code and more quickly or efficiently because certain data elements, such as the conditional code, are invalidated. Accordingly, certain embodiments improve computational inefficiencies, enhance performance of workloads with certain branches, and reduce or altogether eliminate pipeline stall and flushing for certain workloads.

In one example, "branch" or "branch instruction" refers to a computer instruction that causes a computer to initiate execution of a different instruction sequence and thus deviate from its default behavior of executing instructions in order or in an otherwise predetermined sequence or series. In computer architecture, there are many types of branch instructions, such as conditional branch instructions, unconditional branch instructions, direct branch instructions, indirect branch instructions, forward branch instructions, backward branch instructions, and the like.

In one example, a "conditional branch instruction," a "conditional code," or "conditional branches" refer to a machine instruction used in certain computer architectures to take a branch along a workflow pipeline based on occurrence, non-occurrence, presence, or non-presence of a condition, such as an greater-than, a less-than, an equality, or an inequality. In one example, a "forward branch instruction" or "forward code" refers to a machine instruction used in certain computer architectures where a branch target address is present after the forward branch instruction.

In one example, a "forward branch instruction" or "forward code" refers to a machine instruction used in certain computer architectures where a branch target address is present after the forward branch instruction. A forward branch code has a positive offset because forward branch instructions are employed to jump forward in memory, advancing to instructions located later in the program sequence. In one example, a "backward branch instruction" or "backward code" refers to a machine instruction used in certain computer architectures where a branch target address is present before the backward branch instruction. A backward branch code has a negative offset because backward branch instructions are employed to jump backward in memory, moving to instructions located prior in the program sequence. In one example, an "offset" refers to a displacement defining a movement forward or backward in memory relative to the current instruction's address. Example offsets include a value defining how many bytes, bits, or words to move forward or backward in memory. In general, "positive offsets" indicate moving forward, while "negative offsets" indicate moving backward. Certain forward branches are used for conditional execution.

Certain computing systems execute tasks in association with a pipeline. In one example, a "pipeline" refers to a set of stages that a product or service goes through before being released, transmitted, deployed, or otherwise finalized. Examples stages of a pipeline include an instruction fetch stage, a decode and dispatch stage, a register-read stage, an execute stage, and a write-back stage, such as those stages illustrated in FIG. 4.

Typically, a computing device can execute the conditional branch instructions. This typically means that the computing device either takes or does not take a direction of the branch based on occurrence of the condition. In one example, the direction of the branch is either taken or not taken in the execute stage of the pipeline. The computing device may predict (for example, speculate) the target address of the taken direction to avoid waiting until the branch is resolved. For example, predicting the target address is performed by predicting that the branch direction is taken using any suitable branch predictor algorithm. In this example, the computing device stalls the next instruction until the branch direction is resolved in the execute stage. If the speculation is not correct, a branch misprediction can occur in the execute stage to cause a pipeline flush.

In one example, "pipeline flushing" refers to a procedure enacted by a computing device when it cannot guarantee correct processing of its instruction pipeline in the next clock cycle. For example, pipeline flushing includes clearing (or "flushing") the pipeline to prevent corruption caused by pipelining. Essentially, pipeline flushing ensures more accurate execution of instructions in a sequence, but creates latencies in executing the pipeline flushing. Additionally, pipeline flushing reduces computational speeds and consumes computational resources that could otherwise be used to perform other operations, such as those associated with executing a task. Further compounding the issue, certain computing devices are configured with faster clock speeds, deeper pipeline sizes, and the capabilities to perform multiple instructions each clock cycle. As clock speeds have increased, as more instructions get performed each clock cycle, and as pipeline sizes have become larger, the branch misprediction penalty associated with the pipeline flush has increased and resulted in a significant drop in processing performance.

To address these and other technical issues, certain embodiments disclosed herein include performing a forward conditional branch instruction with less code, thereby improving performance of certain computing tasks. Certain endowments perform the forward conditional branch instruction with less code because the conditional code is invalidated, as discussed herein.

By way of example, certain embodiments access a task, such as an artificial intelligence (AI)-based task or other computational task to be performed by a processor. Thereafter, certain embodiments determine (1) that the computing task includes a forward conditional branch instruction including conditional code and forward code defining a positive offset. Suppose that a task is implemented in association with a Reduced Instruction Set Computer (RISC)-V architecture. An example forward conditional branch instruction is branch-if-equal ("beq"). Further suppose the following forward conditional branch instruction is received: "beq x1, x2, Label." In this example, a computing system reading this instruction causes the workflow pipeline to jump to the "Label" if registers "x1" and "x2" are equal. In this example and similar to certain stores, these instructions read two registers but don't write to any register.

Additionally, certain embodiments determine that the forward conditional branch instruction is taken as part of executing the computing task, and determine that the positive offset is less than or equal to an offset threshold value. For example, the threshold value is based on at least one of a branch misprediction penalty or a number of clock cycles associated with executing the conditional code. In one example, "branch misprediction penalty" refers to a condition that may be present when performing certain tasks and is indicative of resource utilization indicative of recovery to a correct path after detecting a misprediction. In one embodiment, the branch misprediction penalty result in pipeline refill, which can slow down performance and execution of the task.

Based on the positive offset being less than or equal to the threshold value and based on the forward conditional branch instruction being taken, certain embodiments invalidate one or more data elements from the conditional code and that correspond to the positive offset. For example, invalidating the one or more data elements includes reprogramming the data elements assigned to the conditional code so that these data elements are reprogrammed as no-operation (NOP) data elements. As a result, invalidating the one or more data elements causes the task to be executed without the conditional code committing in a write-back stage of the pipeline, thereby improving computational speed and efficiency while reducing likelihood of misprediction.

The present disclosure provides one or more technical solutions that have technical effects in light of various technical problems. Particular embodiments have the technical effect of improved lifespan and operation of hardware components by reducing inefficiencies that manifest when pipeline flushing occurs. Instead, certain embodiments avoid pipeline flushing by invalidating the conditional code that would otherwise cause pipeline flushing in the case of a misprediction. Further, particular embodiments have the technical effect of saving power and improving computational efficiency in performing computationally expensive operations, such as those associated with performing certain tasks, such as computing tasks. For example, certain embodiments perform a forward conditional branch instruction with less code because the invalidated code is not committed in a write-back stage of the pipeline. Additionally, certain embodiments have the technical effect of increasing scalability, allowing computing systems to enforce dozens, hundreds, thousands, or even millions of tasks, having many dependencies and forward conditional branch instructions. In this manner, certain workloads, neural network training operations, neural network inference operations, and other neural network operations can be performed more efficiently in fewer clock cycles as compared to certain existing approaches.

Turning now to FIG. 1A, a block diagram is provided showing an example operating environment 100 in which some embodiments of the present disclosure can be employed. It should be understood that this and other arrangements described herein are set forth only as examples. Other arrangements and elements (for example, machines, interfaces, functions, orders, and groupings of functions) are used in certain embodiments in addition to or instead of those shown, and some elements can be omitted altogether for the sake of clarity. Further, certain elements described herein are functional entities that are implemented as discrete or distributed components or in conjunction with other components, and in any suitable combination and location. Various functions described herein as being performed by one or more entities are carried out by hardware, firmware, and/or software. For instance, some functions are carried out by a processor executing instructions stored in memory.

Among other components not shown, example operating environment 100 includes a number of user computing devices, such as user devices 102a and 102b through 102n; a number of data sources, such as data sources 104a and 104b through 104n; server 106; sensors 103a and 107; and network 110. It should be understood that operating environment 100 shown in FIG. 1A is an example of one suitable operating environment. Each of the components shown in FIG. 1A is implemented via any type of computing device, such as the computing device 1000 illustrated in FIG. 10, for example. In one embodiment, these components communicate with each other via network 110, which includes, without limitation, one or more local area networks (LANs) and/or wide area networks (WANs). In one example, network 110 comprises the internet, intranet, and/or a cellular network, amongst any of a variety of possible public and/or private networks.

It should be understood that any number of user devices, servers, and data sources can be employed within operating environment 100 within the scope of the present disclosure. Each may comprise a single device or multiple devices cooperating in a distributed environment, such as the distributed computing environment 900 in FIG. 9. For instance, server 106 is provided via multiple devices arranged in a distributed environment that collectively provides the functionality described herein. Additionally, other components not shown may also be included within the distributed environment.

User devices 102a and 102b through 102n can be client user devices on the client-side of operating environment 100, while server 106 can be on the server-side of operating environment 100. Server 106 may comprise server-side software designed to work in conjunction with client-side software on user devices 102a and 102b through 102n so as to implement any combination of the features and functionalities discussed in the present disclosure. For example, user device 102a associated with a user account can communicate workloads over network 110 to the server 106 for processing consistently with a corresponding service-level agreement (SLA). This division of operating environment 100 is provided to illustrate one example of a suitable environment, and there is no requirement for each implementation that any combination of server 106 and user devices 102a and 102b through 102n remain as separate entities. In one embodiment, the server 106 includes certain components of systems 200, 300, 350, 400, 500, 900, and 1000 of FIGS. 2, 3A, 3B, 4, 5, 9, and 10, respectively.

In some embodiments, user devices 102a and 102b through 102n comprise any type of computing device capable of use by a user. For example, user devices 102a and 102b through 102n are the type of computing device 1000 described in relation to FIG. 10. By way of example and not limitation, a user device is embodied as a personal computer (PC), a laptop computer, a mobile device, a smartphone, a smart speaker, a tablet computer, a smart watch, a wearable computer, a personal digital assistant (PDA) device, a virtual-reality (VR) or augmented-reality (AR) device or headset, music player (MP) or an MP3 player, a global positioning system (GPS) device, a video player, a handheld communication device, a gaming device or system, an entertainment system, a vehicle computer system, an embedded system controller, a camera, a remote control, an appliance, a consumer electronic device, a workstation, any other suitable computer device, or any combination of these delineated devices.

In some embodiments, data sources 104a and 104b through 104n comprise data sources and/or data systems, which are configured to make data available to any of the various constituents of operating environment 100 or systems 200, 300, 350, 400, 500, 900, and 1000 of FIGS. 2, 3A, 3B, 4, 5, 9, and 10, respectively. For instance, one or more data sources 104a and 104b through 104n provide (or make available for accessing) workload data, computing logic, register data, and any other data disclosed herein. Certain data sources 104a and 104b through 104n are discrete from user devices 102a and 102b through 102n and server 106 or are incorporated and/or integrated into at least one of those components. In one embodiment, one or more of data sources 104a and 104b through 104n comprise one or more sensors 107, which are integrated into or are associated with one or more of the user device(s) 102a and 102b through 102n or server 106. Examples of data made available by data sources 104a and 104b through 104n include a workload data, threshold data, register data, processor specifications, computer resource allocation parameters associated with a workload, and any other data disclosed herein.

Operating environment 100 can be utilized to implement one or more of the components of systems 200, 300, 350, 400, 500, 900, and 1000 of FIGS. 2, 3A, 3B, 4, 5, 9, and 10, respectively, to perform any suitable operations. Example operations include accessing an artificial intelligence (AI)-based task; determining that the AI-based task comprises a forward conditional branch instruction comprising conditional code and forward code defining a positive offset; determining that the forward conditional branch instruction is taken as part of executing the AI-based task; determining that the positive offset is less than or equal to an offset threshold value; based on the positive offset being less than or equal to the threshold value and based on the forward conditional branch instruction being taken, invalidating one or more data elements from the conditional code and that correspond to the positive offset; and subsequent to invalidating the number of data elements from the forward conditional branch instruction, executing the AI-based task. Operating environment 100 can also be utilized for implementing aspects of methods 600, 700, and 800 in FIGS. 6, 7, and 8, respectively.

Figure 1B:
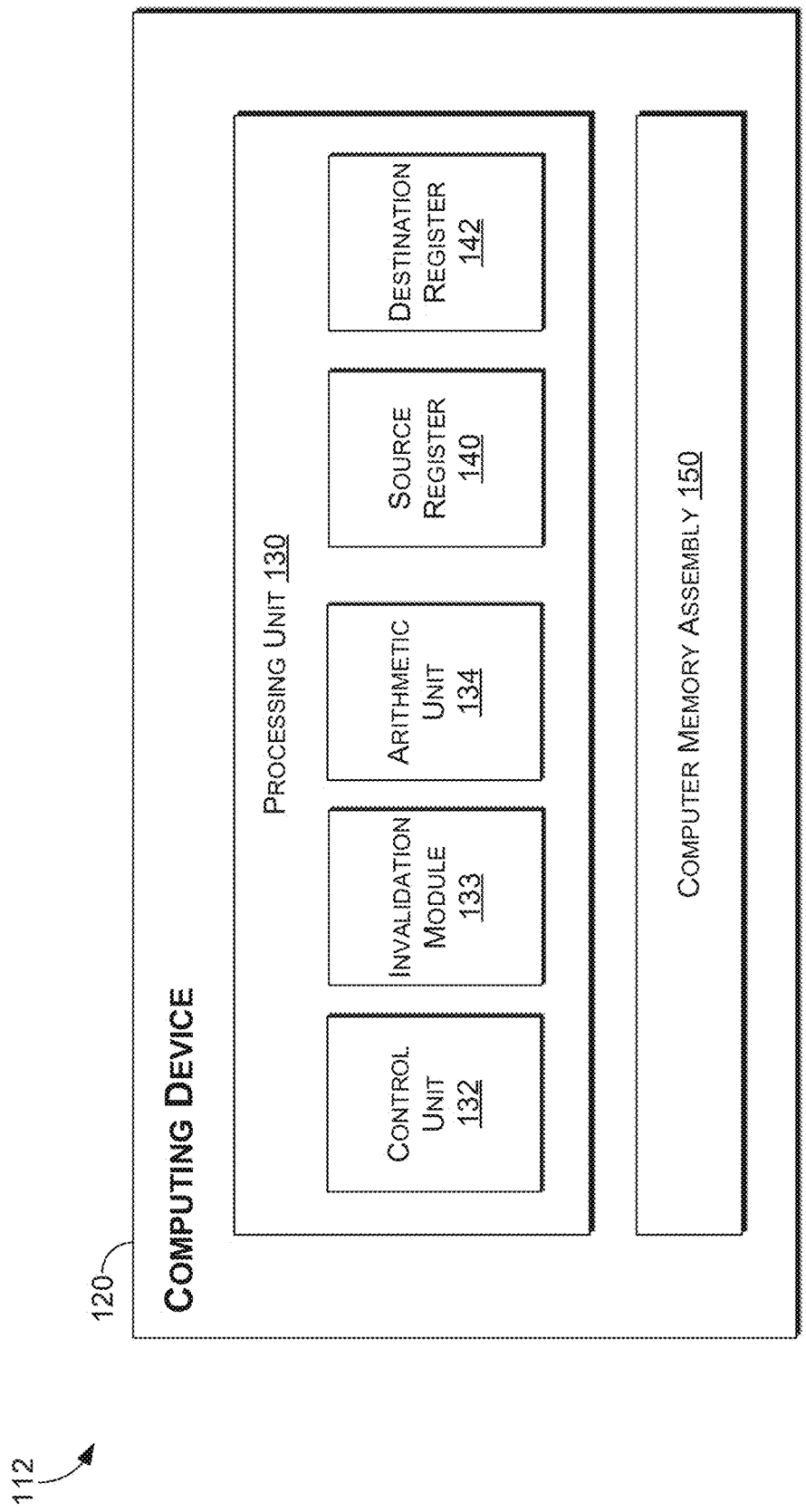
FIG. 1B depicts a block diagram of an example computing device suitable for implementations of the present disclosure.

FIG. 1B illustrates an example system 112 that includes a computing device 120 suitable for use in implementing aspects of the technology described herein. As illustrated, the example computing device 120 includes a processing unit 130 that includes a control unit 132, an invalidation module 133, an arithmetic unit 134, a source register 140, and a destination register 142; the example computing device 120 also includes a computer memory assembly 150. The processing unit 130 includes any suitable processor such as the processor 1014 of FIG. 10.

Embodiments of the control unit 132 of the processing unit 130 include electronic circuitry that uses electrical signals to direct the entire computing device 120 to execute stored program instructions. In one example, the control unit 132 does not directly execute program instructions; rather, the control unit 132 directs other parts of the system to do so. Embodiments of the control unit 132 communicate with the invalidation module 133, the arithmetic unit 134, and the computer memory assembly 150. The control unit 132 coordinates operations between the invalidation module 133, the arithmetic unit 134, the source register 140, and the destination register 142, for example, to implement certain embodiments described herein.

Embodiments of the invalidation module 133 include electronic circuitry that accesses a task, and based on the task, invalidates or generates instructions to invalidate one or more data elements from a forward conditional branch instruction. In one embodiment, the invalidation module 133 accesses a task or a portion of the task being executed or coordinated by the control unit 132 or the arithmetic unit 134. For example, the invalidation module 133 determines that the task or portion of the task includes a branch. Embodiments of the invalidation module 133 determine that the forward conditional branch instruction is taken as part of executing the task and/or determines whether the positive offset is less than or equal to an offset threshold value. If the positive offset is less than or equal to an offset threshold value, then embodiments of the invalidation module 133 generate computer code to invalidate one or more data elements from conditional code of the forward conditional branch instruction and that correspond to the positive offset. In one example, the control unit 132 or the arithmetic unit 134 receive the computer code to invalidate one or more data elements associated with the conditional code of the forward conditional branch instruction.

Figure 2:
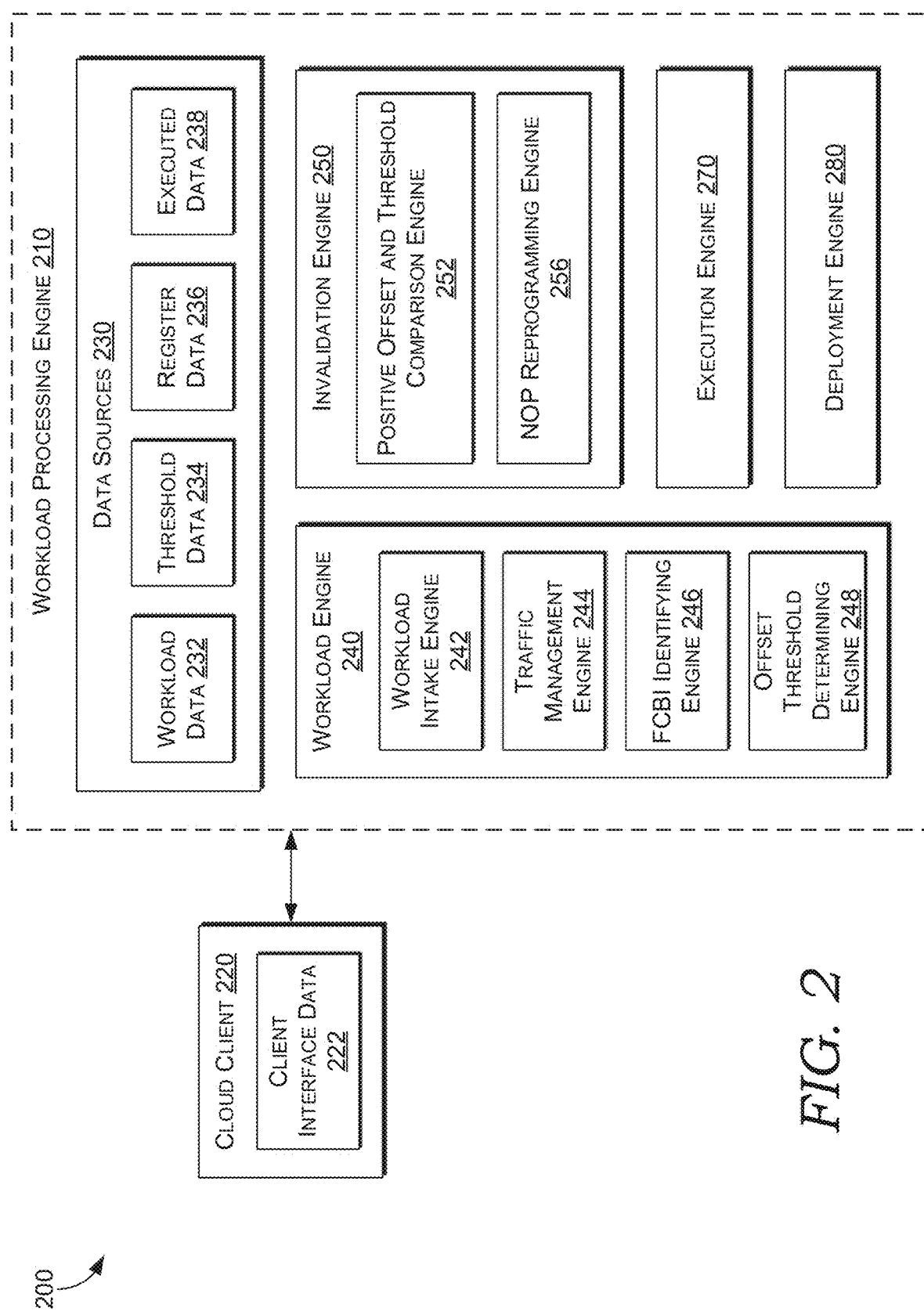
FIG. 2 is a block diagram of an example architecture for efficiently performing a task containing certain forward conditional branch instructions, in accordance with an embodiment of the present disclosure.

Embodiments of the arithmetic unit 134 include the electronic circuitry that executes arithmetic and logical operations, such as those discussed herein, for example, by system 200 of FIG. 2. In some embodiments, the arithmetic unit 134 performs any number of arithmetic operations, or mathematical calculations, such as addition, subtraction, multiplication, and division. Additionally, in some embodiments, the arithmetic unit 134 also performs logical operations, such as comparisons of any data elements such as numbers, letters, or special characters, to name a few. Other logical operations that can be performed by the arithmetic unit 134 include, among others, equal-to operations, less-than operations, greater-than operations, less-than-or-equal-to operations, greater-than-or-equal-to operations, and not-equal operations. Thereafter, the computing device 120 can then take action based on the result of the comparison. In some embodiments, after performing a comparison operation, the computing device 120 is able to coordinate the efficient execution of tasks based on certain data elements being invalidated and other operations discussed herein. In some embodiments, the arithmetic unit 134 performs logical operations as part of a workload, for example, including AI-based tasks.

Continuing with FIG. 1B, the illustrated processing unit 130 includes a source register 140 and a destination register 142. In one example, the "source register" 140 refers to dedicated space, in the processing unit 130 or the computer memory assembly 150, that provides input data. In one example, "destination register" 142 refers to dedicated space, in the processing unit 130 or the computer memory assembly 150, that holds the results. Although illustrated within the processing unit 130, the source register 140 and the destination register 142 can be part of any component within the computing device 120 or any component external to the computing device 120.

In one example, the source register 140 holds the data used in a task (for example, arithmetic, logical, or data movement). When executing an instruction, the source register 140 provides the input data. For example, suppose the arithmetic unit 134 is tasked with adding two numbers. In this example, one of the numbers would be in the source register 140. In one example, the destination register 142 corresponds to storage space within or external to the computing device 120 where the result of the operation is stored. After performing an operation (for example, the addition of two numbers), the arithmetic unit 134 outputs the result to the destination register 142, the control unit 132, or the invalidation module 133.

Embodiments of computer memory assembly 150 include at least one of: primary storage (also referred to in one example as "main memory") and secondary storage. The processing unit 130 interacts with primary storage, referring to it for both instructions and data. In the context of primary storage, embodiments of the computer memory assembly 150 hold data only temporarily while the computing device 120 executes computer-readable instructions as part of executing a program. In the context of secondary storage, embodiments of the computer memory assembly 150 hold permanent or semi-permanent data on some external magnetic or optical medium, for example. In some embodiments, the primary storage and/or the secondary storage include the source register 140 and/or the destination register 142.

With reference to FIG. 2, illustrated is a block diagram of an example architecture for efficiently performing a task containing certain forward conditional branch instructions. In one example, the task is part of a larger collection of tasks that define a workload such as an AI-based workload. As set forth above, an example forward conditional branch instruction includes conditional code and forward code defining a positive offset. Example system 200 includes computing logic and infrastructure for employing a workload processing engine 210 to invalidate one or more data elements from the conditional code and that correspond to the positive offset based on certain conditions being satisfied, in accordance with aspects of the technology described herein.

FIG. 2 includes components that correspond to components described with reference to other figures. The system 200 further includes client device 220 having client interface data 222; data sources 230 having workload data 232, threshold data 234, register data 236, and executed data 238; the workload engine 240 having workload intake engine 242, traffic management engine 244, forward conditional branch instruction (FCBI) identifying engine 246, and offset threshold determining engine 248; invalidation engine 250 having positive offset and threshold (POT) comparison engine 252, and NOP reprogramming engine 256; execution engine 270; and deployment engine 280. In some embodiments, the system 200 is implemented based on certain example environments described herein to implement embodiments of the technical solution disclosed herein.

In some embodiments, the system 200 is configured to execute a task of a workload by invalidating one or more data elements from conditional code and that correspond to the positive offset when certain conditions are satisfied. In some embodiments, the system 200 includes the workload processing engine 210 that operates with management engine clients (such as the management engines of client device 220, workload orchestrator 390 of FIGS. 3A and 3B, and/or job scheduler 392 of FIGS. 3A and 3B), determines whether a task includes a forward conditional branch instruction, determines whether the forward conditional branch instruction is taken as part of executing the AI-based task, determines whether the positive offset is less than or equal to an offset threshold value, invalidates one or more data elements from the conditional code and that correspond to the positive offset, and continues executing the AI-based task.

In some embodiments, the client device 220 includes client-side computing logic and instructions that complement and supplement the server-side computing logic and instructions of the workload processing engine 210 for executing the tasks of a workload based on invalidating data elements from the conditional code of the forward conditional branch instruction. For example, the system 200 (1) performs operations based on a workload associated with one or more clients and (2) provides computing architecture and interfaces for determining branches of the task, invalidating one or more data elements from the conditional code and that correspond to the positive offset based on the positive offset being less than or equal to the threshold value and based on the forward conditional branch instruction being taken, and executing the task based on the invalidation, as described herein.

Workload data 232, threshold data 234, register data 236, and executed data 238 can be stored and retrieved via data sources (for example, data sources 230) of the system 200 and can include data that support providing the services associated with a system 200. For example, system 200 supports recording tasks received from certain clients 220 as workload data 232; maintaining up-to-date thresholds (also referred to as "offset thresholds" in one example) for different types of tasks or forward conditional branch instructions as threshold data 234; recording data assigned to or stored on registers, such as source registers 140 (FIG. 1B) and destination registers 142 (FIG. 1B); and recording the output of the executed task as executed data 238. Embodiments of the system 200 manage workload data 232, threshold data 234, register data 236, and executed data 238. Additional data (e.g., metadata) associated with the workload data 232, threshold data 234, register data 236, and executed data 238 can be tracked and stored in data sources 230.

With continued reference to FIG. 2, the client device 220 is communicatively coupled to the workload processing engine 210. In one embodiment, the client interface data 222 is configured to cause the client device 220 to interact with the infrastructure, components, or services provided by the workload processing engine 210. In one embodiment, the client interface data 222 includes logic to present graphical user interface (GUI) elements, with which a user may interact with, to control data associated with the client device 220. In one embodiment, the GUI elements include selectable icons, drop-down menus, scripting interfaces, text blocks, tables, and so forth. In some embodiments, the client device 220 submits control instructions for orchestrating a workload having certain tasks, such as AI-based tasks, to be executed by the workload processing engine 210. Although discussed in the context of a client device 220, system 200 may instead or additionally employ other components such as workload orchestrator 390 of FIGS. 3A and 3B, and/or job scheduler 392 of FIGS. 3A and 3B.

Continuing with FIG. 2B, certain embodiments of the workload engine 240 are configured to access workloads from the client device 220, determine tasks within the workloads, and analyze the tasks. Embodiments of the workload engine 240 determine one or more tasks contained in a workload and determine presence of certain branches and associated data, such as a positive offset associated with a forward conditional branch instruction. In some embodiments, the workload engine 240 determines an offset threshold indicative of a value for the positive offset that if not exceeded causes the invalidation engine 250 to invalidate one or more data elements from the conditional code of the forward conditional branch instruction and that correspond to the positive offset, as discussed herein.

The illustrated workload intake engine 242 of the workload engine 240 is configured with computing logic and infrastructure to receive workload data 232 defining a workload associated with a client device 220. In one embodiment, the workload intake engine 242 of the workload engine 240 is configured with computing logic to receive the workload from the client device 220 and/or from the data sources 230 as workload data 232. In one embodiment, the workload intake engine 242 of the workload engine 240 is configured with computing logic to determine a workload from a user query received from the client device 220. In one embodiment, the workload intake engine 242 translates the user query into workload data 232 and a plurality of associated tasks. For example, the client request includes a query, made via a user input into a GUI associated with the client interface data 222. The workload intake engine 242 may translate the user input into a workload. From the workload, the illustrated workload intake engine 242 determines one or more tasks. In some embodiments, the workload intake engine 242 translates the client request into a uniform format that is accessible by the other components of the workload engine 240, the invalidation engine 250, the execution engine 270, and/or the deployment engine 280. In some embodiments, the workload intake engine 242 accesses the tasks as Single Input, Multiple Data (SIMD).

In one embodiment, the workload intake engine 242 of the workload engine 240 is configured with computing logic to determine metadata associated with the workload from the client device 220. For example, the workload intake engine 242 determines priority information or a classification associated with the client or the workload. In one example, "priority information" refers to a predetermined or dynamically calculated value or importance of the workload. For example, a priority value of one workload or task could be higher than a priority value of another workload or task based on parameters defined in an SLA.

In some embodiments, the workload intake engine 242 determines whether the workload is associated with a particular type of workload, such as a collection of AI-based tasks. For example, the workload intake engine 242 determines whether the task or workload is classified as an AI-based task, a streaming task (for video, audio, or multimodal content), a gaming task, and so forth. In one embodiment, the workload intake engine 242 further classifies the tasks or workload into a sub-classification. The workload may correspond to a collection of AI-based tasks, and the AI-based tasks may be further sub-classified into "inference subtasks" and "training subtasks." Embodiments of the FCBI identifying engine 246 or the invalidation engine 250 can access these classifications to determine presence of certain forward conditional branch instructions.

In some embodiments, the traffic management engine 244 of the workload engine 240 is configured with computing logic to service client requests and direct the client requests to appropriate processors based on a traffic-routing method. In one embodiment, the traffic management engine 244 directs a task determined by the workload intake engine 242 to a target processor.

In one embodiment, the traffic management engine 244 processes client requests based on a traffic-routing method indicative of a priority level of the processor and/or the task. For example, the traffic management engine 244 receives the priority information of the workload. In one example, the priority information received from the workload intake engine 242 includes the priority level, or, in some embodiments, the workload intake engine 242 determines the priority level from the priority information. In this manner, the traffic management engine 244 can process the workloads based on the priority level associated with the workload or tasks. For example, the traffic management engine 244 accesses an SLA defining a priority of the workloads or associated requesting accounts/user device. In this example, the traffic management engine 244 assigns tasks to processors for execution, such that tasks having a higher priority level are assigned for performance before tasks having a lower priority level. Alternatively, in one example, traffic management engine 244 assigns to the processor tasks having a lower priority level before assigning tasks having a higher priority level.

In one embodiment, the traffic management engine 244 orders tasks for processing based on a traffic-routing method indicative of a level of similarity of the datatype of the task to the datatype of the processor. For example, the traffic management engine 244 receives, from the FCBI identifying engine 246, an indication of tasks containing branches, such as a forward conditional branch instruction. Thereafter, in this example, the traffic management engine 244 groups certain tasks for execution based on dependencies between code defining the task. Certain dependencies of the tasks are determined based on the pipeline, such as that illustrated in FIG. 4. For example, a portion of a task associated with the instruct-fetch stage is performed before a portion of the task associated with the decode and dispatch stage, which is performed before the execute stage, which is performed before the write-back data stage. The dependencies, groupings, or classifications for the tasks can be stored as workload data 232. Other dependencies are possible.

In one embodiment, the traffic management engine 244 determines whether the forward conditional branch is taken. For example, the workload data 232 may include tasks having any number of forward conditional branch instructions. During execution of the task, the forward conditional branch instruction may be taken. When the forward conditional branch instruction is taken, embodiments of the traffic management engine 244 identifies the time during which the forward conditional branch instruction is taken. When the forward conditional branch instruction is taken, embodiments of the traffic management engine 244 store in workload data 232 a signal or an indication that the forward conditional branch instruction is taken. When the forward conditional branch instruction is taken, embodiments of the traffic management engine 244 pass to the invalidation engine 250 an indication or a signal that the forward conditional branch instruction is taken. In this manner, the invalidation engine 250 can invalidate the one or more data elements when the forward conditional branch instruction is taken, as discussed herein.

Continuing with FIG. 2B, in some embodiments, the FCBI identifying engine 246 of the workload engine 240 is configured with computing logic to determine a forward conditional branch instruction. In one embodiment, the FCBI identifying engine 246 accesses the workload data 232 and determines metadata (or other data of a task contained in the workload). From the workload data or the metadata, the FCBI identifying engine 246 determines branches contained in a task. For example, FCBI identifying engine 246 accesses workload data 232, and from the workload data 232, determines that the task contains a branch (for example, in the form of a computer instruction that causes a computer to initiate execution of a different instruction sequence and thus deviate from its default behavior of executing instructions in order or in an otherwise predetermined sequence or series). From this branch, the FCBI identifying engine 246 further determines whether the branch includes conditional code and forward code. In one embodiment, the conditional code includes computer instructions to take a branch along a workflow pipeline based on occurrence, non-occurrence, presence, or non-presence of a condition, such as an equality or inequality. In one embodiment, the forward code includes computer instructions defining a branch target address at a point in the pipeline after the forward branch instruction.

The forward code can define a positive offset as set forth herein. For example, suppose the FCBI identifying engine 246 identifies the following forward conditional branch instruction: "beq i0, i1, 2." In this example, the execution engine 270 reading this instruction causes the workflow pipeline to jump by a factor of "2" if registers "i0" and "i1" are equal. In this example and similar to certain stores, these instructions read two registers but don't write to any register. In this example, each instruction takes up 4 bytes of memory, and program counter is incremented by 4 bytes to go to the next instructor. Therefore, in the example above, where the instruction includes jumping by a factor of 2, the forward branch instruction jumps forward 8 bytes of memory because 2×4=8. The 4-byte increments of this example are for illustration only and not to be interpreted as limiting because increments of other sizes are possible.

In one embodiment, the FCBI identifying engine 246 determines the type of code included in a branch. For example, the FCBI identifying engine 246 determines precedence of pointers in a line of code. In some embodiments, the FCBI identifying engine 246 determines that the pointer includes both conditional code and forward code defining a positive offset. In one embodiment, the FCBI identifying engine 246 accesses certain cryptic strings, such as a secure hash algorithm (SHA)-1 hash to determine the type of branch. Based on identifying both conditional code and forward code, embodiments of the FCBI identifying engine 246 determine presence of a forward conditional branch instruction. In some embodiments, the FCBI identifying engine 246 identifies other types of branches, such as conditional branch instructions, unconditional branch instructions, direct branch instructions, indirect branch instructions, forward branch instructions, backward branch instructions, and the like.

In some embodiments, the FCBI identifying engine 246 identifies a string or collection of forward conditional branch instruction having multiple dependencies as determined by the traffic management engine 244. Certain workloads include AI-based tasks that extensively employ if-statements, if-else-if statements, and the like. These statements can be embodied as forward conditional direct branches identified by the FCBI identifying engine 246. For example, the following lines of code show a plurality of forward condition branch instructions having dependencies therebetween.

```
i0, i1, _label_1
#conditional_block_1
_label_1:
beq i2, i1, _label_2
#conditional_block_2
_label_2:
beq i3, i1, _label_3
#conditional_block_3
_label_3
```

In this example, each of the branch instructions is a forward conditional direct branch that has conditional code and forward code. Based on the data in register i1, the corresponding "conditional block" in an if-else-if statement may be executed. In this example, the directions of the branches are unpredictable and achieving a high degree of precision and accuracy in predicting the correct direction is difficult due to the randomness of the data to be compared with pre-existing values. To avoid the inaccuracies arising by existing approaches for branch prediction, certain embodiments of the workload processing engine 210 invalidate one or more data elements from the conditional code, such that the one or more data elements correspond to the positive offset based on certain conditions. One such example condition is the positive offset of the forward code being less than or equal to an offset threshold value.

Continuing with FIG. 2B, in some embodiments, the offset threshold determining engine 248 of the workload engine 240 is configured with computing logic to determine an offset threshold value. In one embodiment, the offset threshold value is preset for a particular workload, for a particular task, for a type of processor executing a task, for a numerical format by which the task is executed, for a type of branch, and so forth. For example, in one embodiment, the offset threshold determining engine 248 dynamically determines the offset threshold value for each workload, for each task, or at discrete instances in time. In this manner, the offset threshold determining engine 248 can determine an optimal threshold value for a particular forward conditional branch instruction based on a context associated with the forward conditional branch instruction.

For example, offset threshold determining engine 248 determines a context associated with a task. By way of example, a "context" comprises information about a task or workload, such as application usage, consumption time, power consumption associated with a task, a classification of the task or workload, or other suitable interactions. For instance, a context can indicate types of task or workload, such as streaming content, performing an AI-based task, and the like. Alternatively, or in addition, data sources 230 may explicitly provide a context. In one embodiment, a context includes information about an account, a service-level agreement (SLA) associated with the workload, a type of processor performing the task, and so forth. From this context, embodiments of the offset threshold determining engine 248 determine the offset threshold value.

In some embodiments, the offset threshold determining engine 248 determines the offset threshold value based on at least one of a branch misprediction penalty or a number of clock cycles associated with executing the conditional code. For example, the offset threshold determining engine 248 accesses workload data 232 and the corresponding conditional code and forward code. From the workload data 232 and the corresponding conditional code and forward code, the offset threshold determining engine 248 determines how many cycles it would take to execute that conditional code (for example, using a particular processor).

In some embodiments, the offset threshold determining engine 248 determines the offset threshold value such that a particular cycle count is less than the branch misprediction penalty. In some embodiments, the branch misprediction penalty is indicative of time wasted in fetching and decoding instructions from a wrong path, such that fetching and decoding instructions from a wrong path causes pipeline refill, which can be executed across a plurality of clock cycles. In one example, the offset threshold determining engine 248 determines the offset threshold value based on a clock cycle latency of executing a task having at least one forward conditional branch instruction. For example, suppose a task has a first forward conditional branch instruction with a latency of 5 clock cycles, a second related forward conditional branch instruction has a latency of 5 clock cycles, and a third related forward conditional branch instruction has a latency of 5 clock cycles. In this example, executing the task comprises a 15 clock cycle penalty, such that the offset threshold determining engine 248 determines the offset threshold to be a value that results in a smaller clock cycle penalty. For example, an offset threshold value of 4 would result in a clock cycle penalty less than 15. In this example, the offset threshold determining engine 248 determines that the offset threshold value of 4 achieves improved computation. For example and as depicted in Table 1 below, processing speed decreased by 24% in one embodiment that was reduced to practice and tested.

In some embodiments, the offset threshold determining engine 248 stores one or more offset threshold values in data sources 230 as threshold data 234. In one example, the one or more offset threshold values are indexed based on corresponding tasks and metadata. For example, suppose a task includes performing AI-based inferences for large language models (LLM). In this example, the corresponding offset threshold value is stored as a record that is indexed to correspond to a particular processor performing AI-based inferences. Any suitable indexing mechanism can be employed to facilitate the invalidation engine 250 accessing the offset threshold values in certain contexts.

Continuing with FIG. 2B, in some embodiments, the invalidation engine 250 is configured with computing logic to invalidate one or more data elements from the conditional code. In one example, the one or more data elements correspond to hardware components of the computing device 120, such as the source register 140, the destination register 142, and/or the computer memory assembly 150 of FIG. 1B. In one embodiment, the invalidation engine 250 accesses the workload data 232 and the threshold data 234 to determine whether the positive offset of the forward code (stored in the workload data 232) is less than or equal to an offset threshold value (stored in the threshold data 234). In one embodiment, the invalidation engine 250 accesses the workload data 232 to determine whether the forward conditional branch instruction is taken as part of executing a task. Based on the positive offset being less than or equal to the threshold value and based on the forward conditional branch instruction being taken, embodiments of the invalidation engine 250 invalidate one or more data elements from the conditional code and that correspond to the positive offset. The illustrated invalidation engine 250 includes a positive offset and threshold (POT) comparison engine 252 and an NOP reprogramming engine 256.

Embodiments of the POT comparison engine 252 are configured with computing logic to compare the positive offset of the forward instruction and the offset threshold value. In some embodiments, the POT comparison engine 252 accesses the offset threshold value corresponding to the particular context of the task and processor executing the task. The POT comparison engine 252 may access the offset threshold value from data sources 230 as threshold data 234. Alternatively, the POT comparison engine 252 accesses the offset threshold data from the offset threshold determining engine 248. In some embodiments, the POT comparison engine 252 accesses the positive offset from the forward code of the forward conditional branch instruction. The POT comparison engine 252 may access the positive offset of the forward code from data sources 230 as workload data 232. Alternatively, the POT comparison engine 252 accesses the positive offset from the FCBI identifying engine 246 or any other component of the workload processing engine 210.

In some embodiments, the POT comparison engine 252 determines whether the positive offset is less than or equal to the offset threshold value. Embodiments of the POT comparison engine 252 determine a magnitude or size of the positive offset and of the offset threshold value. For example, suppose that the size of the positive offset is 2 instructions, such that each instruction is 4 bits. In this example, the positive offset has a magnitude or size of 8 bits. Further, suppose that the offset threshold value for the context associated with the particular processor executing the particular task is 16 bits. In this example, the positive offset is less than the offset threshold value. As a result, in this example, the POT comparison engine 252 generates a signal indicative of the positive offset being less than the offset threshold value. In one embodiment, this signal is communicated to the NOP reprogramming engine 256.

Embodiments of the NOP reprogramming engine 256 are configured with computing logic to perform an invalidation operation based on certain conditions. In one embodiment, the NOP reprogramming engine 256 performs an invalidation operation on the source register or destination register to modify register data 236. In some embodiments, the NOP reprogramming engine 256 accesses a first indication that the positive offset is less than or equal to the threshold value and a second indication that the forward conditional branch instruction is taken. Based on receiving the first and second indications, the NOP reprogramming engine 256 invalidates the data elements from the conditional code, such that the data elements correspond to the positive offset. In some embodiments, the NOP reprogramming engine 256 invalidates the data elements from the conditional code based on receiving one of the first indication or the second indication.

Embodiments of the NOP reprogramming engine 256 invalidate the one or more data elements by reprogramming the data elements as no-operation (NOP) data elements. By reprogramming the data elements as NOP data elements, data contained in these data elements is executed to cause a processor to do nothing. In one example, the NOP instruction is an assembly-level operation that has no affect on the program's behavior, so the NOP instruction does not cause a processor to modify any registers, memory, or flags. For example, the execution engine 270 accesses the NOP instruction or data element and does not modify the data in data source 230 or perform any substantive computations based on the NOP instruction or data element. In some embodiments, the NOP reprogramming engine 256 invalidates the one or more data elements by another mechanism instead of an NOP mechanism. For example, the NOP reprogramming engine 256 alternatively or additionally employs a compiler intrinsic, a memory barrier, a spinlock, a halt instruction, or a delay loop, to name a few.

In some embodiments, register data 236 includes (1) data, such as a task written to the source register 140, and/or (2) data, such as an output of the task written to destination register 142. In one embodiment, register data 236 includes data associated with a Single Input, Multiple Data (SIMD) processor (referred to in one example as "SIMD data"). In one embodiment, the register data 236 includes metadata associated with the source register 140 and/or the destination register 142, including, but not limited to, the processor, hardware, context surrounding the forward conditional branch instruction, or computing device associated with the source register 140 and/or the destination register 142, the timestamp during which content was recorded to the source register 140, and/or the destination register 142, the datatype format associated with content recorded to the source register 140 and/or the destination register 142, and the like.

Embodiments of the execution engine 270 are configured with computing logic to perform the task received from workload engine 240 or accessed from the client device 220 based on the data elements being invalidated by invalidation engine 250. In this manner, the task may be more efficiently executed without the drawbacks of the wrong prediction being made because the conditional code is invalidated so no prediction occurs. In one embodiment, the execution engine 270 accesses the task from workload engine 240 and/or an invalidation instruction generated by invalidation engine 250. In some embodiments, the execution engine 270 executes the task subsequent to the data elements from the conditional code being invalidated. In one embodiment, the output of the execution engine 270 is output as executed data 238 for storage in the data sources 230. For example, if the task includes an AI-based task such as performing an inference (for example, a classification, prediction, or the like), the output of executing this AI-based task is saved as executed data 238 in data sources 230. As another example, if the task includes an AI-based task such as performing training; the output, such as a labeling; a normalization; a validation; or the like, the output of executing this AI-based task is saved as executed data 238 in data sources 230. The executed data 238 may be generated in fewer clock cycles and with more efficiency and accuracy based on the data elements being invalidated and based on other embodiments described herein.

Embodiments of the deployment engine 280 are configured with computing logic to transmit or communicate the output of the task. In some embodiments, the deployment engine 280 accesses outputs from the components of system 200 or other data stored in data sources 230. In one example, the deployment engine 280 transmits the accessed output or data to any suitable device, such as the client device 220. In some embodiments, the deployment engine 280 configures the transmitted data for efficient presentation on a client device. For example, the deployment engine 280 interfaces with one or more applications or services on a device, such as the client device 220, or across multiple user devices or in the cloud. For example, the deployment engine 280 manages the presentation of the task executed in the datatype format of the processor across multiple user devices associated with that user, which the user accesses via a mobile device, laptop, or VR headset, and so forth.

Figure 3A:
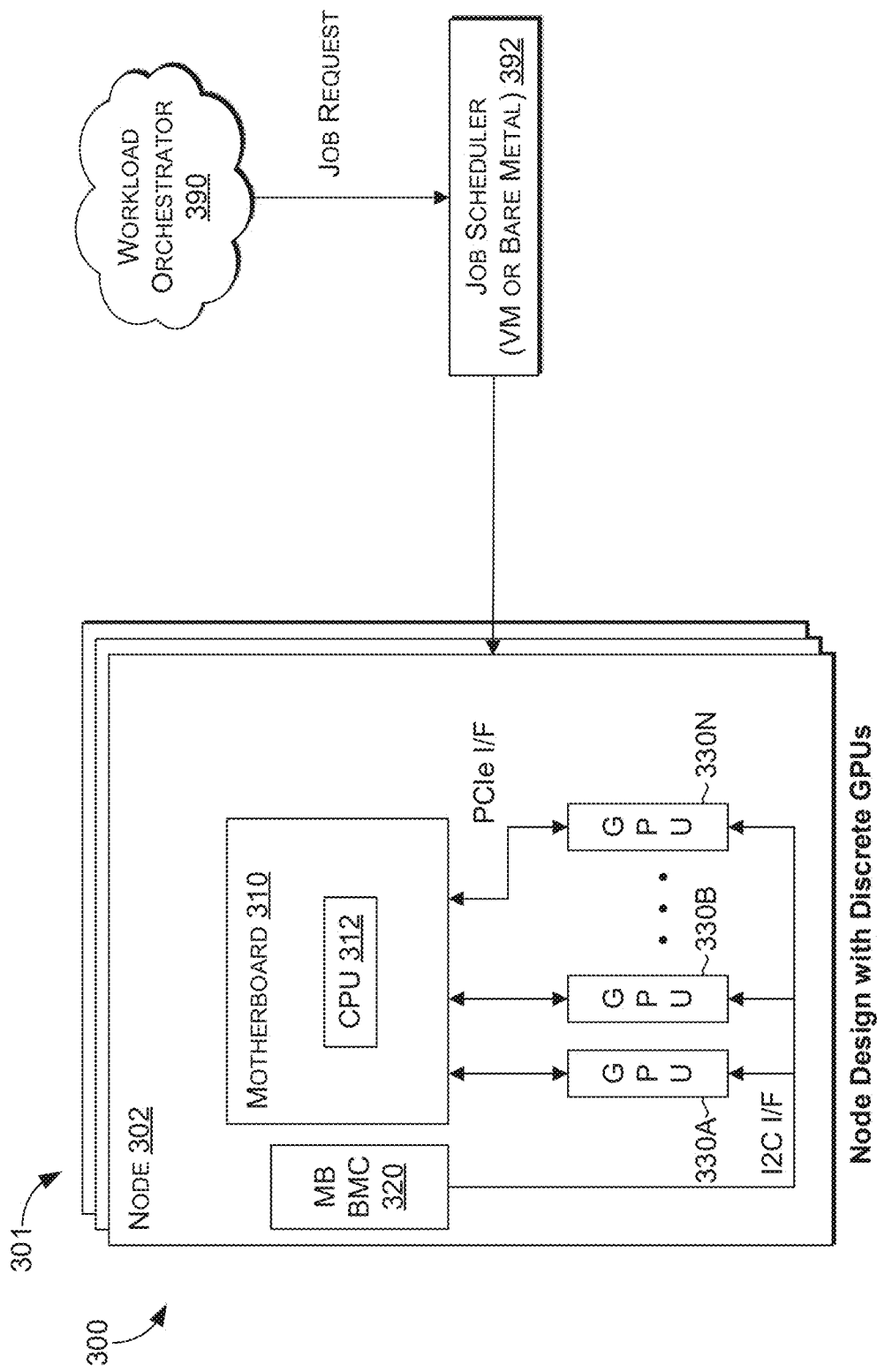
FIG. 3A is a block diagram of an example system including a node having discrete accelerators, in accordance with an embodiment of the present disclosure.

Referring now to FIG. 3A, depicted is a block diagram of an example system 300 including a node 302, in accordance with an embodiment of the present disclosure. As illustrated, the system 300 includes a rack 301 including any number of nodes 302. As illustrated, the node 302 includes a motherboard 310 having a central processing unit (CPU) 312; a motherboard (MB) baseboard management controller (BMC) 320; and discrete accelerators, such as the illustrated graphics processing units (GPUs) 330A and 330B through 330N. In one embodiment, the node 302 refers to an individual self-contained server unit within the rack 301. In one example, the node 302 runs applications, processes data, and performs various tasks. Certain nodes 302 vary in terms of processing power, memory, storage, and other specifications. In a data center, nodes 302 can be organized into a cluster or network to collectively handle the computational and storage needs of applications. In one embodiment, node 302 corresponds to node 930 of FIG. 9.

In one example, the mother board (MB) BMC 320 corresponds to a controller that monitors the operating parameters of the node and determines whether the operating parameters are within or outside of a target range. An example operating parameter includes power consumption or computational efficiency associated with executing instructions containing certain branches, such as a forward conditional branch instruction. In some embodiments, the MB BMC 320 directly communicates control signals to the GPUs to control the GPUs' execution of a workload by invalidating certain data elements associated with the conditional code. In another example, the MB BMC 320 communicates the control signals to the motherboard 310, causing the motherboard 310 to control the execution of a workload by invalidating certain data elements associated with the conditional code based on certain conditions, such as the positive offset being less than or equal to the threshold value and/or the forward conditional branch instruction being taken.

In one example, a "rack," "server rack," or "data center rack" refers to an assembly of multiple nodes 302 or servers, each with its own motherboard 310. The nodes 302 within the rack 301 work together to deliver the computational power and services for large-scale data center operations. The arrangement of nodes 302 in the rack 301 can vary depending on the specific needs and configurations of the data center. In one example, the "motherboard" refers to the main circuit board of the node 302 and includes a CPU 312, a memory (such as that illustrated in FIGS. 9 and 10), and other components that enable the node 302 to function. The motherboard serves as the central hub for connecting all the hardware components within a server. The motherboard can provide various interfaces and connectors for networking, storage, and expansion options, thereby connecting and facilitating communication between all the server's parts.

In some embodiments, the node 302 runs and implements artificial intelligence (AI) and machine learning (ML) based on workloads submitted by user devices via corresponding applications, such that the workloads are processed using the embodiments described herein. Although the illustrated embodiments include GPUs 330A and 330B through 330N, in one embodiment, nodes 302 that run these AI and ML workloads have 4 accelerators, 8 accelerators, 16 accelerators, 64 accelerators, or any suitable number of accelerators.

To facilitate controlling the GPUs 330, the node 302 employs any suitable interface connecting the motherboard 310 to the GPUs 330. In a first non-limiting example, the node 302 employs Peripheral Component Interconnect Express (PCIe), such as PCIe Form Factor (FF), to facilitate the motherboard 310 in controlling the GPUs 330, as well as implementing the embodiments disclosed herein. In one example, the "PCIe" refers to a high-speed interface used for connecting various hardware components inside a node 302 to enable the more efficient execution of computationally intensive tasks, such as AI and ML workloads. In some instances, different generations of PCIe (for example, PCIe 3.0, PCIe 4.0, or PCIe 5.0) offer varying levels of bandwidth and performance, with certain newer versions of PCIe providing faster data transfer speeds and improved GPU performance (for example, lower latency) when paired with motherboard 310.

In a second non-limiting example, the node 302 employs Open Compute Project (OCP) Accelerator Module (OAM), such as OAM Form Factor (FF), to facilitate the motherboard 310 in controlling the GPUs 330, as well as implementing the embodiments disclosed herein. In one example, the "OAM" refers to a high-speed interface used for connecting various hardware components inside a node 302 to enable the execution of computationally intensive tasks, such as AI and ML workloads.

In one embodiment, AI or ML workloads are classified as AI training workloads, AI inference workloads, or any other classification. In one example, AI training workloads are run as higher precision datatype formats across multiple racks in a cluster to train one or more models based on training models. However, certain AI training workloads can be run across multiple clusters. On the other hand, in one example, AI inference workloads are run as lower precision datatype formats within a rack on one or more nodes 302 to perform AI-related tasks, such as predictions, classifications, and generation of content, such as text, images, video, music, sounds, and the like. In some embodiments, AI inference workloads consume less compute power than AI training workloads. It should be understood that this disclosure is not limited to AI or ML workloads, such as those described herein, because the embodiments disclosed herein facilitate performing other additional or alternative tasks, such as rendering, gaming, or other GPU-based workloads. Indeed, in some embodiments, a combination of AI or ML tasks, as well as other GPU-based workloads can be performed by the components of node 302 or the rack.

In one embodiment, one or more components of the node 302 are directly or indirectly communicatively coupled to the workload orchestrator 390, for example, via the job scheduler 392. In one example, the workload orchestrator 390 refers to a distributed multitenant service, such as a software running on a hardware component, that provides unified service abstraction to run or orchestrate workloads across different customers. In one embodiment, the workload orchestrator 390 executes AI or ML workloads, such as the AI training and inference workloads discussed herein, as well as other suitable tasks. An example workload orchestrator includes Singularity or Slurm. For example, the workload orchestrator 390 creates, deploys, or monitors tasks or task execution within one or more VMs running on one or more coprocessors.

Figure 3B:
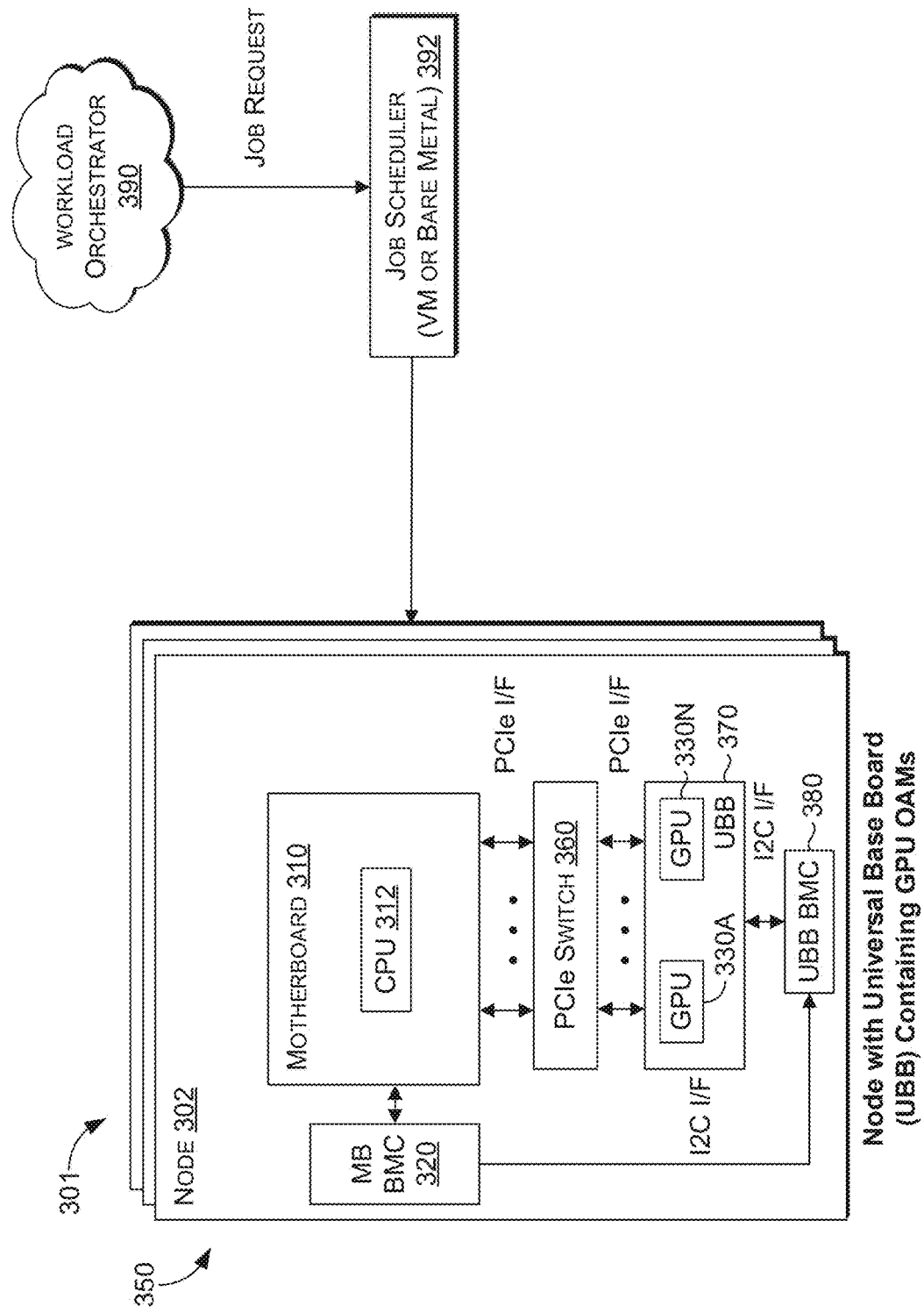
FIG. 3B is a block diagram of an example system including a node having a uniform baseboard (UBB) containing discrete accelerators, in accordance with an embodiment of the present disclosure.

As illustrated in FIGS. 3A and 3B, the workload orchestrator 390 manages the capacity for system 300 and 350 to perform tasks, such as AI or ML workloads. In one example, the workload orchestrator 390 manages the capacity for any system, such as (among others) system 300, 350, or 900 of FIGS. 3A, 3B, and 9, respectively, to perform AI or ML workloads. In some embodiments, the workload orchestrator 390 receives tasks or workloads, for example, from workload applications. For example, the workload orchestrator 390 receives tasks or workloads in the order they are submitted, received, or cached.

After receiving the tasks or workloads, embodiments of the workload orchestrator 390 determine any number of task parameters for the tasks. As a first example, the workload orchestrator 390 determines, for each task or at least one task, at least one parameter, such as a computational resource consumption associated with running the workload, presence of a forward conditional branch instruction, the power consumption associated with performing the task, or any suitable parameter indicative of computational resources used to execute the task.

In some embodiments, the workload orchestrator 390 is communicatively coupled to the job scheduler 392. In one example, the job scheduler 392 refers to a computing component that monitors file movements within the systems 300 or 350, and assigns the corresponding task to a component of the node 302 for execution. For example, if a predetermined time of a task arrives or a triggering file reaches the job scheduler 392, the job scheduler 392 communicates to the node 302 a request to execute the preset task. In one embodiment, the workload orchestrator 390 communicates the task parameters (for example, the first task parameter indicative of a computational resource consumption associated with running the workload and the second task parameter indicative of a series of steps to completion) to the job scheduler 392.

In one embodiment, the job scheduler 392 receives the task parameters, and based on the task parameters, instructs the nodes 302 to create one or more virtual machine (VM) instances or Bare Metal instances. For example, the job scheduler 392 instructs the GPUs 330 of the node to run a VM instance equipped to execute a workload. As another example, the job scheduler 392 submits a request to the node 302 to create the instance (VM 952 of FIG. 9 or any other suitable tenant) for the workloads. For example, the node 302 performs Hyper-V virtualization to create one or more VMs using Hyper-V on a system running any suitable operating system, such as WINDOWS® or IOS®. In one embodiment, the instance includes at least one of the GPUs 330 allocated for the workload. In one embodiment, less computationally expensive workloads (such as AI inference, gaming, and the like) are assigned fewer GPUs 330 attached to the node 302. In another embodiment, more computationally expensive tasks (such as AI training) are assigned all the GPUs 330 in the node 302. In some embodiments, the job scheduler 392 communicates one or more tasks associated with a workload to the node 302 (for example, to the GPUs 330). In some embodiments, the node 302 directs the workloads through the various components to the GPUs 330 for execution.

With reference to FIG. 3B, illustrated is a block diagram of an example system 350 including a node 302, in accordance with an embodiment of the present disclosure. As illustrated, the system 300 includes a rack 301 including a node 302. As illustrated, the node 302 includes a motherboard 310 having a CPU 312; an MB BMC 320; a PCIe Switch 360; a universal baseboard (UBB) 370 having discrete accelerators, such as the illustrated GPUs 330A and 330B through 330N; and a UBB BMC 380. In one example, the PCIe switch 360 refers to a hardware component that manages and routes PCIe connections between various devices of system 350. In one embodiment, the PCIe switch manages device expansion, load balancing, redundancy, and bandwidth among devices connected to the motherboard 310.

In one embodiment, the UBB 370 refers to a hardware component designed to accommodate and support various types of computer-on-modules (COMs) or system-on-modules (SOMs), such as the illustrated GPUs 330A through 330N. In one embodiment, the UBB 370 provides a common interface, connectors, and peripherals that can be used with different COMs, SOMs, and GPUs 330A through 330N. Example UBBs 370 include connectors, interfaces, power management, and various input/output (I/O) options (such as universal serial bus [USB], Ethernet, high-definition multimedia interface [HDMI], general-purpose input/output [GPIO], and the like), making UBBs compatible with a range of SOMs, COMs, and/or GPUs 330A through 330N, for example, from various manufacturers. By allowing the interoperability of various SOMs, COMs, and/or GPUs 330A through 330N, the UBB 370 can facilitate the development process and promote interchangeability of processing modules while reducing the burdens for custom hardware design. In this manner, certain embodiments of the node 302 employ the UBB 370 and switch out the SOMs, COMs, and/or GPUs 330A through 330N, as needed for different workloads and applications to avoid having to design a custom baseboard for each SOM, COM, and/or GPU 330A through 330N.

In one embodiment, the UBB BMC 380 corresponds to a controller that monitors the operating parameters of the UBB 370 or the one or more GPUs 330A through 330N. As discussed herein, embodiments of the UBB BMC 380 control the execution of tasks associated with a workload and the invalidation of certain data elements, such as the data elements associated with the conditional code, based on the positive offset being less than or equal to the threshold value and/or based on the forward conditional branch instruction being taken. For example, the UBB BMC 380 directly communicates control signals to the GPUs 330 to control the GPU's execution of tasks associated with a workload based on the contextual information and data element invalidation discussed herein. In another example, the UBB BMC 380 communicates the control signals to the motherboard 310 or the PCIe switch 360 to cause the motherboard 310 or PCIe switch 360 to control the GPUs 330.

Unlike system 300, system 350 includes a node 302 having the PCIe switch 360; the UBB BMC 380; and the UBB having GPUs 330A and 330B through 330N. For example, whereas in system 300 the MB BMC 380 sends the control signals (for example, to coordinate execution of a workload based on invalidating certain data elements) to the GPUs 330A and 330B through 330N, in system 350, MB BMC 320 sends the control signals to the UBB BMC 380. In one embodiment, the UBB BMC 380 submits control signals to the GPUs 330A and 330B through 330N (for example, via slots or OAMs) to control the GPUs 330.

In one example, submitting the control signals to the GPUs 330A and 330B through 330N includes commands or control instructions (for example, computer code) for determining that the task comprises a forward conditional branch instruction comprising conditional code and forward code defining a positive offset; determining that the forward conditional branch instruction is taken as part of executing the AI-based task; determining that the positive offset is less than or equal to an offset threshold value; invalidating one or more data elements from the conditional code, such that the data elements-correspond to the positive offset based on these determinations; and/or subsequent to invalidating the one or more data elements from the forward conditional branch instruction, executing the AI-based task. Example commands are directly written to the GPUs using Intelligent Platform Management Interface (IPMI) or REDFISH®. In one example, "IPMI" refers to an open, industry-standard interface that was designed for the management of server systems over a number of different types of networks. IPMI functionality includes field-replaceable unit (FRU) inventory reporting, system monitoring, logging of system events, system recovery (including system resets and power-on and power-off capabilities), and alerting, to name a few.

Figure 4:
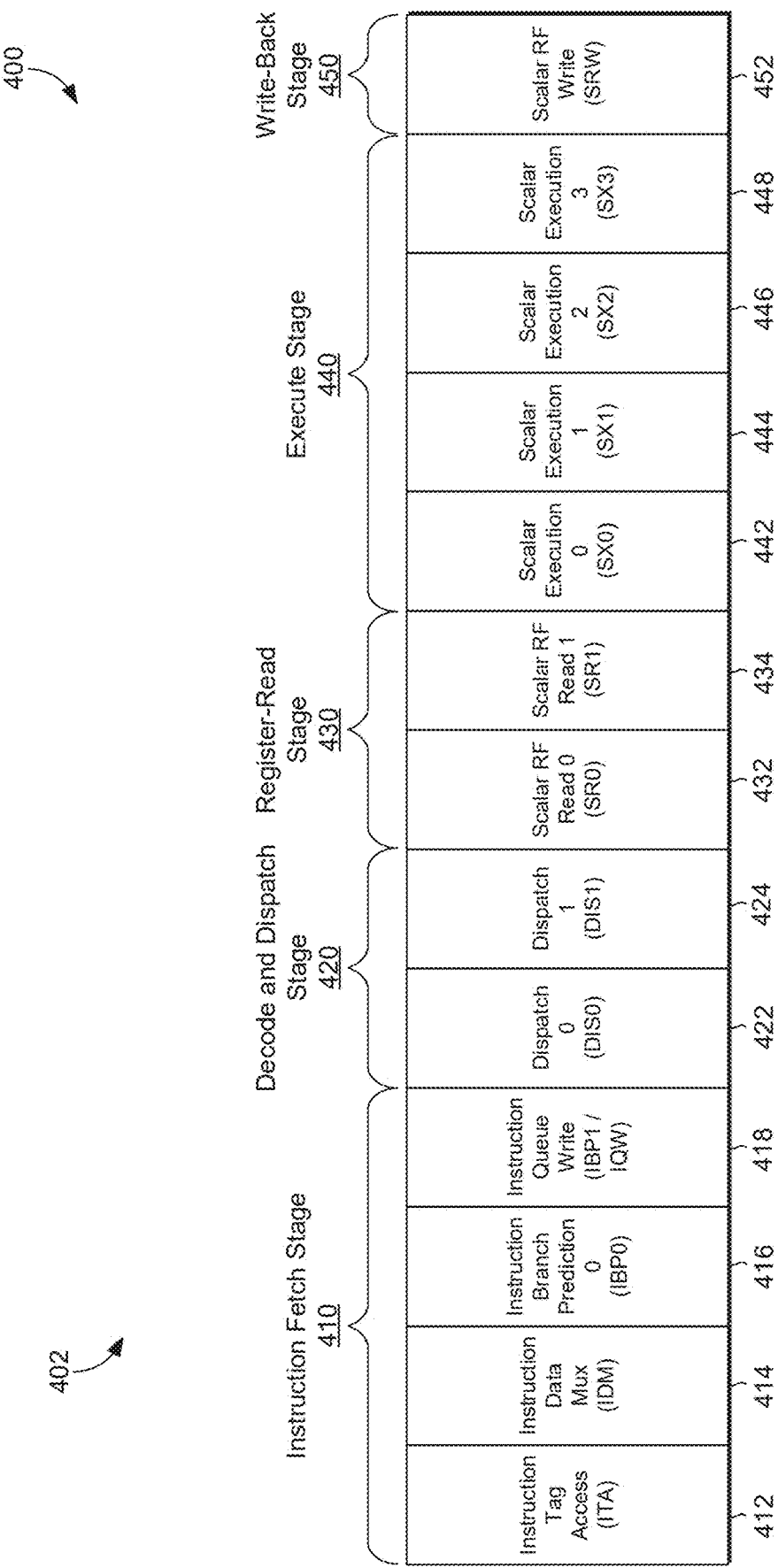
FIG. 4 is a schematic diagram of an example pipeline associated with executing a task, in accordance with an embodiment of the present disclosure.

FIG. 4 is a schematic diagram 400 of an example pipeline 402 used to execute certain tasks, in accordance with an embodiment of the present disclosure. In one example, a pipeline refers to a set of stages that a product or service goes through before being released, transmitted, deployed, or otherwise finalized. Examples stages of a pipeline include an instruction fetch stage 410, a decode and dispatch stage 420, a register-read stage 430, an execute stage 440, and a write-back stage 450, including the substage components illustrated in FIG. 4. For example, the illustrated instruction fetch stage 410 includes four subcomponents 412, 414, 416, and 418; the illustrated decode and dispatch stage 420 includes two substage components 422 and 424; the register-read stage 430 includes two substage components 432 and 434; the execute stage 440 includes four substage components 442, 444, 446, and 448; and the write-back stage 450 includes one substage component 452. In one example, each substage component corresponds to one clock cycle. For example, the illustrated instruction fetch stage includes four components, so the illustrated fetch stage instruction performs its corresponding functionality (for example, fetching instructions for performing a task) in four clock cycles. The illustrated substage components and stages are illustrated as a non-limiting example as alternative or additional stages and/or substage components that can be employed to implement the embodiments described herein.

The illustrated instruction fetch stage 410 generally fetches instructions for executing a particular task. The instructions may be fetched from a cache (for example, the data sources 230 of FIG. 2) storing tasks ready to be processed or executed. The illustrated fetch stage fetches the instruction over four clock cycles. In one embodiment, the instruction fetch stage places the instructions into the two substage components 422 and 424 of the decode and dispatch stage 420. The decode and dispatch stage 420 accesses the fetched instructions and translates the binary representation of an instruction into control signals that are interpretable by a processor.

In one embodiment, the decode and dispatch stage 420 translates the fetched instructions from a first default format to a second format formatted as control signals interpretable for execution. For example, the decode and dispatch stage 420 acts as an abstraction layer between hardware and software, allowing control signals to be modified without breaking binary compatibility. After the instructions are decoded, embodiments of the decode and dispatch stage 420 dispatch the reformatted instruction (for example, the control signals) to a queue. For example, the decode and dispatch stage 420 schedules certain tasks for execution. In the context of certain superscalar processors, the decode and dispatch stage 420 can dispatch up to five instructions per clock cycle.

Continuing with FIG. 4, the register-read stage 430 accesses register data 236 (FIG. 2) to perform a particular task scheduled for execution by the decode and dispatch stage 420. For example, in the context of executing a branch instruction, the register-read stage 430 accesses values that are to be compared as part of the conditional code. In some embodiments, the register-read stage 430 allows reading and writing in the same cycle. For example, a read operation can occur during half of a cycle and the write operation can occur in the other half of the cycle.

Continuing with FIG. 4, the execute stage 440 performs the tasks scheduled by the decode and dispatch stage 420, for example, using the data or values accessed by the register-read stage 430. In the context of performing a forward conditional branch instruction, embodiments of the execute stage 440 access the forward conditional branch instruction and its corresponding forward code and conditional code. Suppose the following forward conditional branch instruction is received: "beq x1, x2, Label." In this example, the execute stage 440 jumps to the "Label" if registers "x1" and "x2" are equal. In one example, the comparison of x1 and x2 occurs in the substage component 442 and/or 444.

Using the embodiments described herein, the execute stage 440 may invalidate one or more data elements from the conditional code, which in this example can include "beq" and associated code. For example, invalidating the one or more data elements includes reprogramming the "beq" and associated code (for example, "x1, x2, Label") as NOP data elements. Indeed, by employing certain embodiments described herein, mispredictions and the subsequent need to flush the pipeline are avoided in the execute stage 440 because prediction algorithms are not performed. Instead, certain data elements may be invalidated when the branch is taken and when the positive offset is less than or equal to the offset threshold value.

Continuing with FIG. 4, write-back stage 450 is generally responsible for writing the fetched value back to the register specified in the instruction. This stage is the final step in the pipeline and involves updating registers with the results of previous instructions. In the context of arithmetic and logical instructions, such as instructions for performing addition, subtraction, or logical operations, the result is computed in the execute stage 440. In the write-back stage 450, this result is written back to the destination register specified in the instruction. In one embodiment, invalidating the one or more data elements prevents the data elements from the conditional code from committing in a write-back stage 450.

The pipeline 402 is one example of a pipeline for executing a workflow and is not intended to be limiting. For example, alternative or additional steps may be performed as part of a pipeline for performing a task or workflow.

Figure 5:
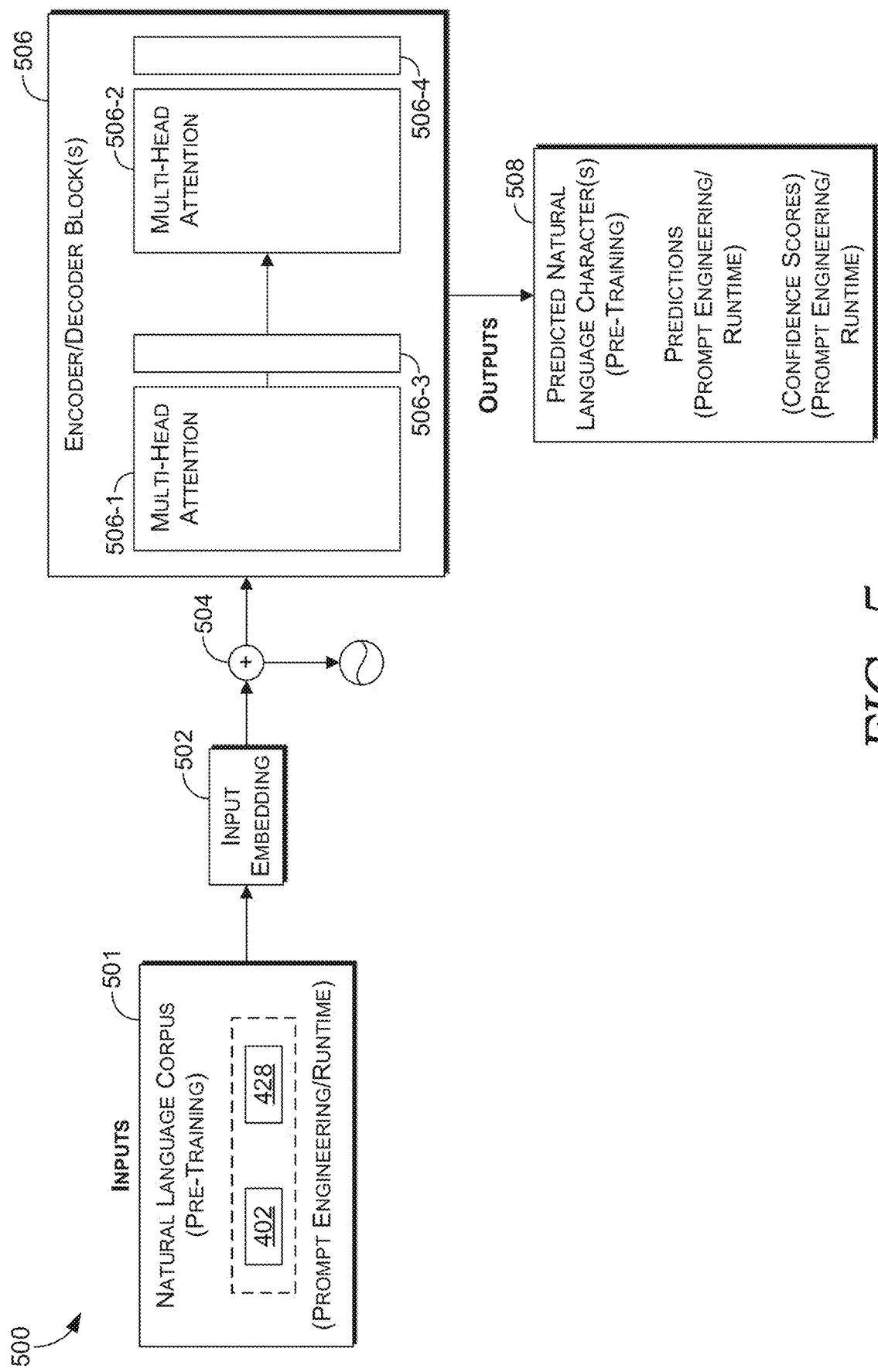
FIG. 5 is a block diagram of a language model that processes inputs by invalidating certain data elements based on occurrence of certain conditions to make particular inferences or predictions, in accordance with an embodiment of the present disclosure.

FIG. 5 is a block diagram of a language model 500 (for example, a Bidirectional Encoder Representations from Transformers [BERT] model or Generative Pre-Trained Transformer [GPT]-4 model) that uses particular inputs to make particular predictions (for example, answers to questions), according to some embodiments. Although this example illustrates a prediction operation being performed based on one or more data elements from the conditional code being invalidated and as part of a task, it should be understood that the certain embodiments described herein can be implemented to perform other neural network tasks, such as inferences or training operations. In various embodiments, the language model 500 includes one or more encoders and/or decoder blocks 506 (or any transformer or portion thereof).

To illustrate, first, a natural language corpus (for example, various WIKIPEDIA English words or BooksCorpus) of the inputs 501 are converted into tokens and then feature vectors and embedded into an input embedding 502 to derive meaning of individual natural language words (for example, English semantics) during pre-training. In some embodiments, to understand English language, corpus documents, such as text books, periodicals, blogs, social media feeds, and the like, are ingested by the language model 500.

In some embodiments, each word or character in the input(s) 501 is mapped into the input embedding 502 in parallel or at the same time, unlike existing long short-term memory (LSTM) models, for example. The input embedding 502 maps a word to a feature vector representing the word. But the same word (for example, "apple") in different sentences may have different meanings (for example, the phone versus the fruit). This is why a positional encoder 504 can be implemented. A positional encoder 504 is a vector that gives context to words (for example, "apple") based on a position of a word in a sentence. For example, with respect to a message "I just sent the document," because "I" is at the beginning of a sentence, embodiments can indicate a position in an embedding closer to "just," as opposed to "document." Some embodiments use a sine/cosine function to generate the positional encoder vector using the following two example equations:

$$PE_{(pos,2i)} = \sin(pos/10000^{2i/d_{model}}) \quad (3)$$

$$PE_{((pos,2i+1)} = \cos(pos/10000^{2i/d_{model}}). \quad (4)$$

After passing the input(s) 501 through the input embedding 502 and applying the positional encoder 504, the output is a word embedding feature vector, which encodes positional information or context based on the positional encoder 504. These word embedding feature vectors are then passed to the encoder and/or decoder block(s) 506, where it goes through a multi-head attention layer 506-1 and a feedforward layer 506-2. The multi-head attention layer 506-1 is generally responsible for focusing or processing certain parts of the feature vectors representing specific portions of the input(s) 501 by generating attention vectors. For example, in Question-Answering systems, the multi-head attention layer 506-1 determines how relevant the $i^{th}$ word (or particular word in a sentence) is for answering the question or how relevant it is to other words in the same or other blocks, the output of which is an attention vector. For every word, some embodiments generate an attention vector, which captures contextual relationships between other words in the same sentence or other sequences of characters. For a given word, some embodiments compute a weighted average or otherwise aggregate attention vectors of other words that contain the given word (for example, other words in the same line or block) to compute a final attention vector.

In some embodiments, a single-headed attention has abstract vectors Q, K, and V that extract different components of a particular word. These are used to compute the attention vectors for every word, using the following equation (5):

$$Z = softmax\left(\frac{Q.K^T}{\sqrt{\text{Dimension of vector } Q, K, \text{ or } V}}\right) \cdot V. \quad (5)$$

For multi-headed attention, there are multiple weight matrices $W^q$, $W^k$, and $W^v$ so there are multiple attention vectors Z for every word. However, a neural network may expect one attention vector per word. Accordingly, another weighted matrix, $W^z$, is used to make sure the output is still an attention vector per word. This matrix can be processed using the embodiments described herein. For example, certain embodiments invalidate one or more data elements from the conditional code and that correspond to the positive offset. For example, invalidating the one or more data elements includes reprogramming the data elements assigned to the conditional code so that these data elements are reprogrammed as no-operation (NOP) data elements to avoid mispredictions and pipeline flush.

In some embodiments, after the layers 506-1 and 506-2, there is some form of normalization (for example, batch normalization and/or layer normalization) performed to smoothen out the loss surface, making it easier to optimize while using larger learning rates. Layers 506-3 and 506-4 represent residual connection and/or normalization layers where normalization recenters and rescales or normalizes the data across the feature dimensions. The feedforward layer 506-2 is a feedforward neural network that is applied to every one of the attention vectors outputted by the multi-head attention layer 506-1. The feedforward layer 506-2 transforms the attention vectors into a form that can be processed by the next encoder block or make a prediction at 508. For example, given that a document includes first natural language sequence "the due date is . . . ," the encoder/decoder block(s) 506 predicts that the next natural language sequence will be a specific date or particular words based on past documents that include language identical or similar to the first natural language sequence.

In some embodiments, the encoder/decoder block(s) 506 includes training to learn language (pre-training) and make corresponding predictions. In some embodiments, there is no fine-tuning because some embodiments perform prompt engineering or learning. Pre-training is performed to understand language, and fine-tuning is performed to learn a specific task, such as learning an answer to a set of questions (in Question-Answering [QA] systems).

In some embodiments, the encoder/decoder block(s) 506 learns what language and context for a word is in pre-training by training on two unsupervised tasks (Masked Language Model [MLM] and Next Sentence Prediction [NSP]) simultaneously or at the same time. In terms of the inputs and outputs, at pre-training, the natural language corpus of the inputs 501 may be various historical documents, such as text books, journals, and periodicals, in order to output the predicted natural language characters in 508 (not make the predictions at runtime or prompt engineering at this point). The example encoder/decoder block(s) 506 takes in a sentence, paragraph, or sequence (for example, included in the input[s] 501), with random words being replaced with masks. The goal is to output the value or meaning of the masked tokens. For example, if a line reads, "please [MASK] this document promptly," the prediction for the "mask" value is "send." This helps the encoder/decoder block(s) 506 understand the bidirectional context in a sentence, paragraph, or line at a document. In the case of NSP, the encoder/decoder block(s) 506 takes, as input, two or more elements, such as sentences, lines, or paragraphs, and determines, for example, if a second sentence in a document actually follows (for example, is directly below) a first sentence in the document. This helps the encoder/decoder block(s) 506 understand the context across all the elements of a document, not just within a single element. Using both of these together, the encoder/decoder block(s) 506 derives a good understanding of natural language.

In some embodiments, during pre-training, the input to the encoder/decoder block(s) 506 is a set (for example, two) of masked sentences (sentences for which there are one or more masks), which could alternatively be partial strings or paragraphs. In some embodiments, each word is represented as a token, and some of the tokens are masked. Each token is then converted into a word embedding (for example, 502). At the output side is the binary output for the next sentence prediction. For example, this component may output 1, for example, if masked sentence 2 follows (for example, is directly beneath) masked sentence 1. The outputs are word feature vectors that correspond to the outputs for the machine learning model functionality. Thus, the number of word feature vectors that are input is the same number of word feature vectors that are output.

In some embodiments, the initial embedding (for example, the input embedding 502) is constructed from three vectors: the token embeddings, the segment or context-question embeddings, and the position embeddings. In some embodiments, the following functionality occurs in the pre-training phase. The token embeddings are the pre-trained embeddings. The segment embeddings are the sentence numbers (including the input[s] 501) that are encoded into a vector (for example, first sentence, second sentence, and so forth, assuming a top-down and right-to-left approach). The position embeddings are vectors that represent the position of a particular word in such a sentence that can be produced by positional encoder 504. When these three embeddings are added or concatenated together, an embedding vector is generated that is used as input into the encoder/decoder block(s) 506. The segment and position embeddings are used for temporal ordering since all of the vectors are fed into the encoder/decoder block(s) 506 simultaneously, and language models need some sort of order preserved.

In pre-training, the output is typically a binary value C (for NSP) and various word vectors (for MLM). With training, a loss (for example, cross-entropy loss) is minimized. In some embodiments, all the feature vectors are of the same size and are generated simultaneously. As such, each word vector can be passed to a fully connected layered output with the same number of neurons equal to the same number of tokens in the vocabulary.

In some embodiments, after pre-training is performed, the encoder/decoder block(s) 506 performs prompt engineering or fine-tuning on a variety of QA data sets by converting different QA formats into a unified sequence-to-sequence format. For example, some embodiments perform the QA task by adding a new question-answering head or encoder/decoder block, just the way a masked language model head is added (in pre-training) for performing an MLM task, except that the task is a part of prompt engineering or fine-tuning. This includes the encoder/decoder block(s) 506 processing the inputs 402 and/or 428, for example, by invalidating the one or more data elements from the conditional code and that correspond to the positive offset based on the positive offset being less than or equal to the threshold value and based on the forward conditional branch instruction being taken, as indicated in 504. Prompt engineering, in one example, is the process of crafting and optimizing text prompts for language models to achieve desired outputs. In other words, prompt engineering comprises a process of mapping prompts (for example, a question) to the output (for example, an answer) that it belongs to for training. For example, if a user asks a model to generate a poem about a person fishing on a lake, the expectation is that it will generate a different poem each time. Users may then label the output or answers from best to worst. Such labels are an input to the model to make sure the model is giving more human-like or best answers, while trying to minimize the worst answers (for example, via reinforcement learning). In some embodiments, a "prompt" as described herein includes one or more of: a request (for example, a question or instruction [for example, "write a poem"]), target content, and one or more examples, as described herein.

In some embodiments, the inputs 501 additionally or alternatively include other inputs. In one example, the predictions of the output 506 include any suitable output, such as an inference. Certain embodiments of inputs 402 and/or 428 represent inputs provided to the encoder/decoder block(s) 508 at runtime or after the model 500 has been trained, tested, and deployed. Likewise, in these embodiments, the predictions in the output 508 represent predictions made at runtime or after the model 500 has been trained, tested, and deployed.

Figure 6:
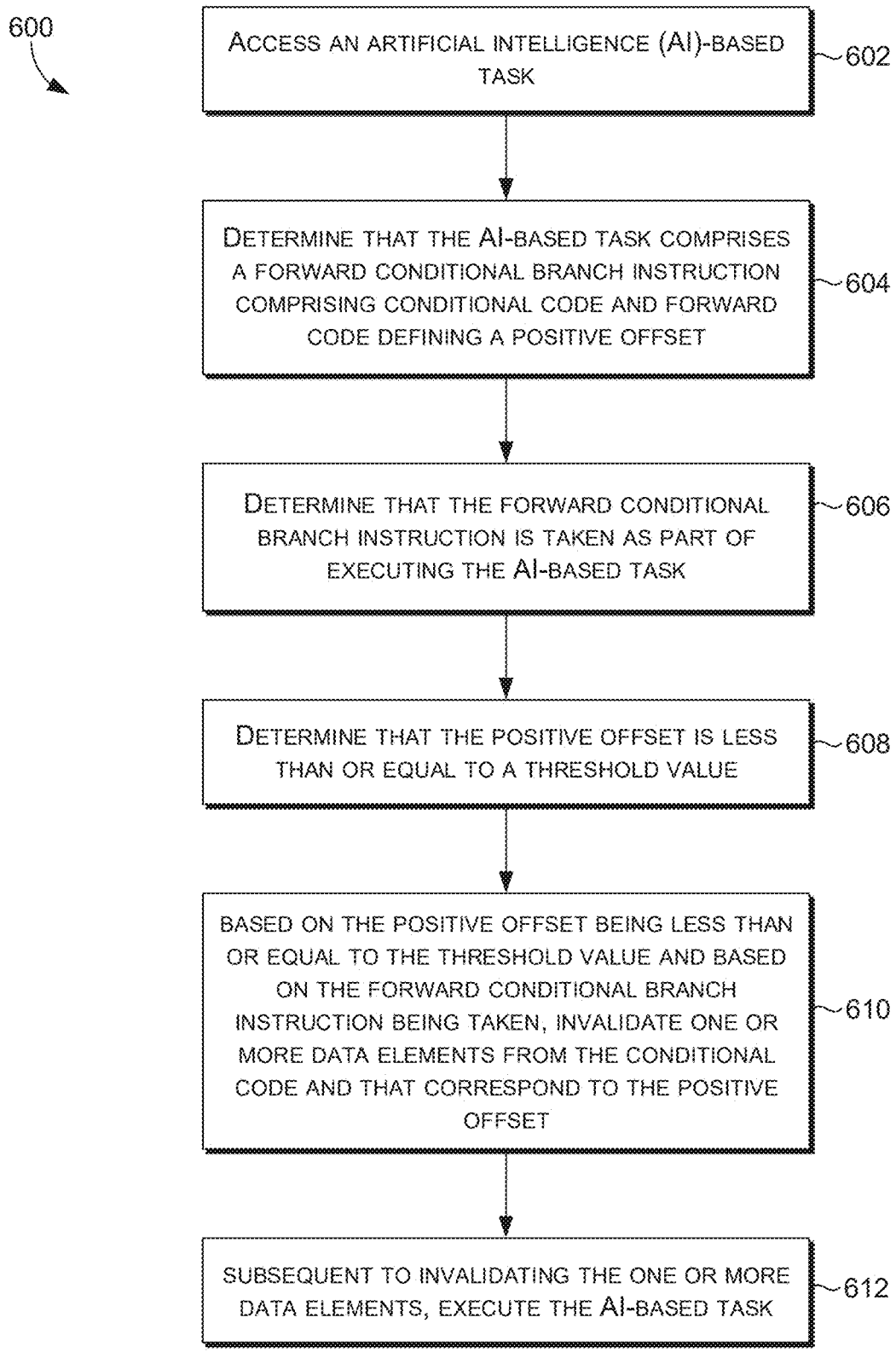
FIG. 6 depicts a flow diagram of a method for causing an artificial intelligence (AI)-based task to be performed by invalidating one or more data elements from conditional code of a forward conditional branch instruction, in accordance with an embodiment of the present disclosure.
Figure 7:
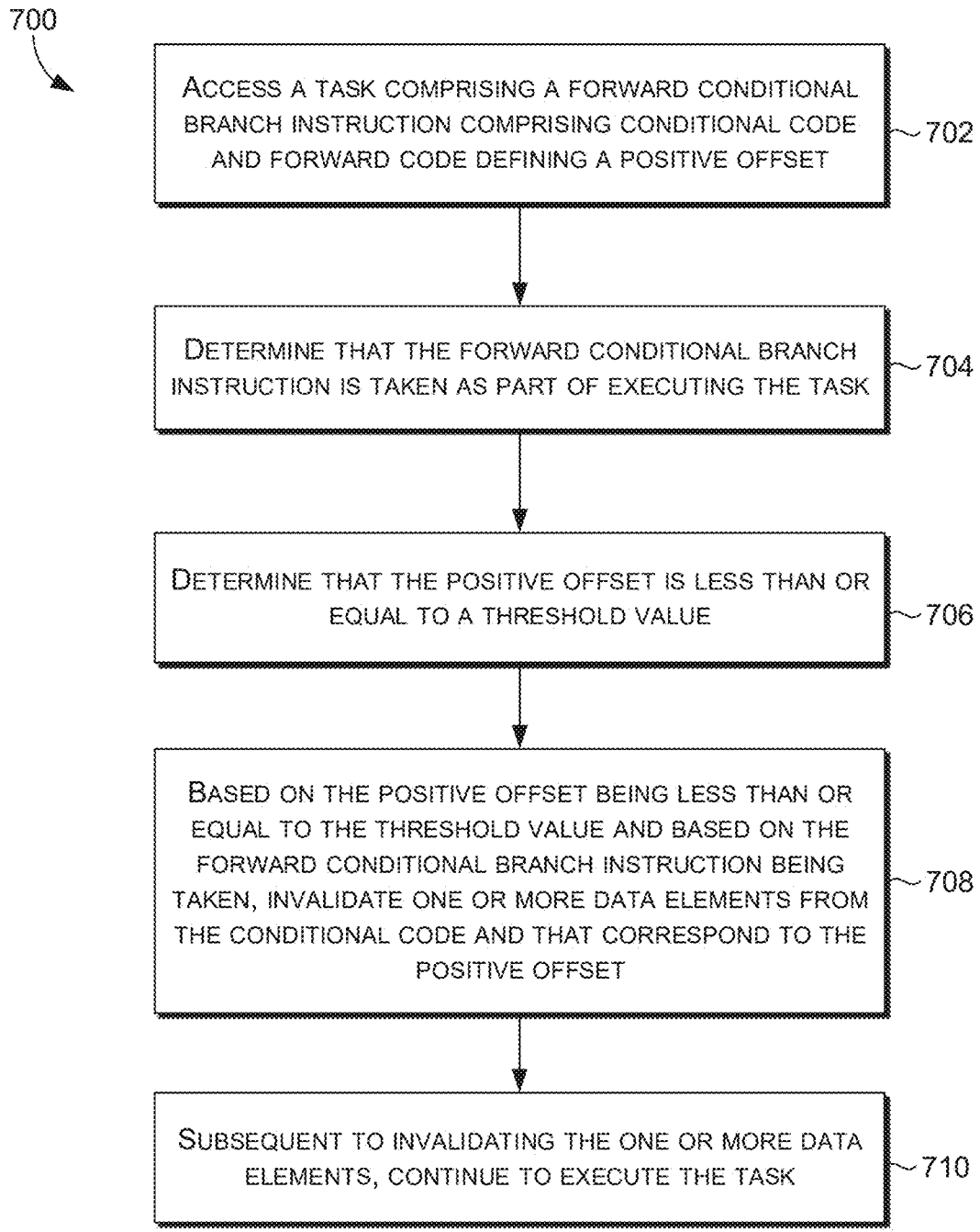
FIG. 7 depicts a flow diagram of a method for performing a task by invalidating one or more data elements from conditional code of a forward conditional branch instruction, in accordance with an embodiment of the present disclosure.
Figure 8:
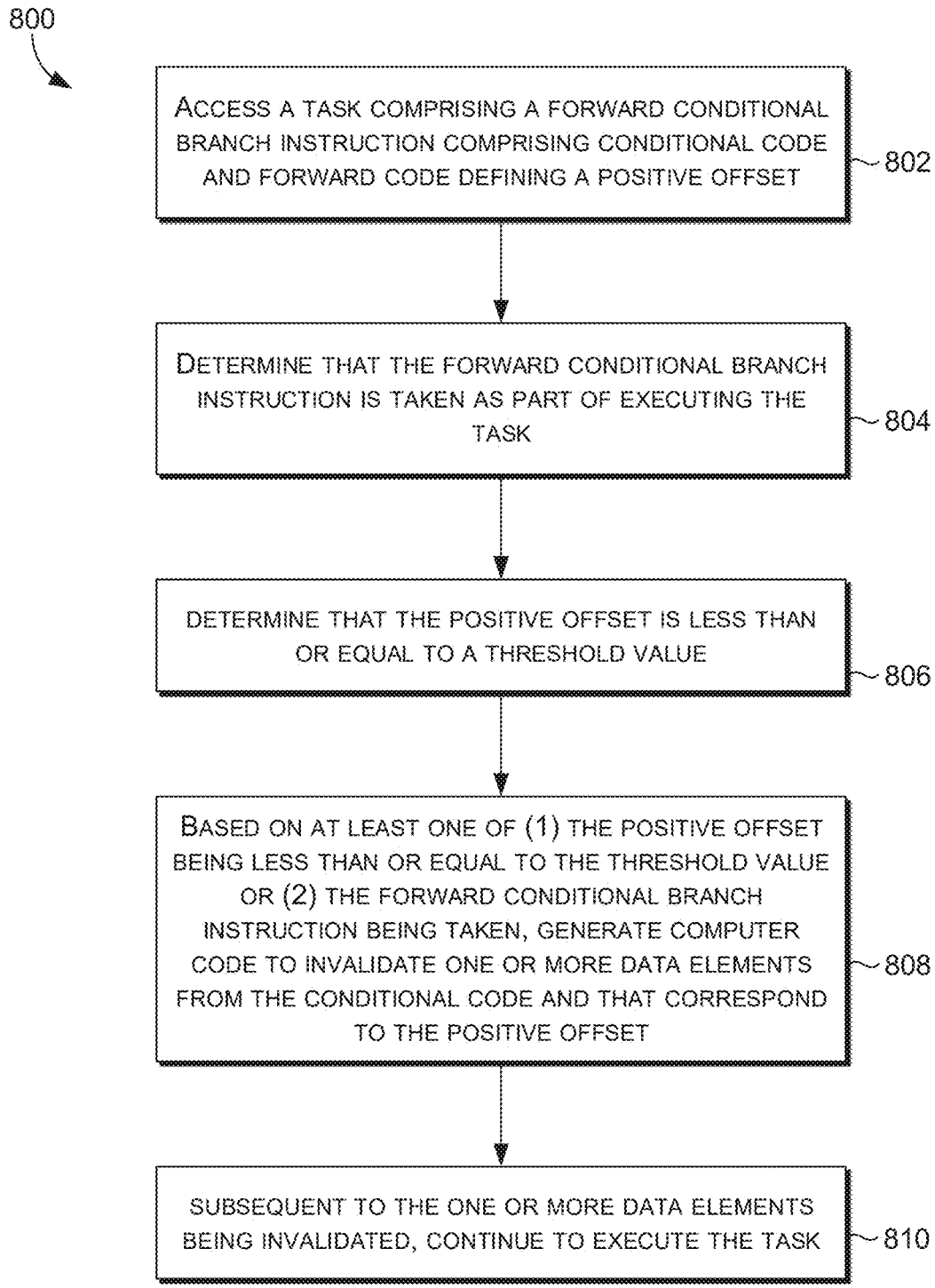
FIG. 8 depicts a flow diagram of a method for continuing to execute a task subsequent to invalidating one or more data elements from conditional code of a forward conditional branch instruction, in accordance with an embodiment of the present disclosure.

Turning now to FIGS. 6, 7, and 8, aspects of example process flows 600, 700, and 800 are illustratively depicted for some embodiments of the disclosure. Embodiments of process flows 600, 700, and 800 each comprise a method (sometimes referred to herein as methods 600, 700, and 800) carried out to implement various example embodiments described herein. For instance, at least one of process flows 600, 700, or 800 is performed to programmatically control circuitry in a hardware component, such as a processor, to perform a task subsequent to invalidating one or more data elements from conditional code and that correspond to the positive offset, which is used to provide any of the improved electronic technology or enhanced technical advantages, as described herein.

Each block or step of process flow 600, process flow 700, process flow 800, and other methods described herein comprises a computing process performed using any combination of hardware, firmware, and/or software. For instance, various functions are carried out by a processor or other hardware component executing instructions stored in memory, such as memory 1012 as described in FIG. 10. Embodiments of the methods can also be embodied as computer-usable instructions stored on computer storage media. Embodiments of the methods are provided by a standalone application, a service or hosted service (standalone or in combination with another hosted service), or a plug-in to another product, to name a few. For example, the blocks of process flows 600, 700, and 800 that correspond to actions (or steps) to be performed (as opposed to information to be processed or acted on) are carried out by one or more computer applications or services, in some embodiments, which operate on one or more user devices, and/or are distributed across multiple user devices, and/or servers, or by a distributed computing platform, and/or are implemented in the cloud, such as is described in connection with FIG. 10. In some embodiments, the functions performed by the blocks or steps of process flows 600, 700, and 800 are carried out by components illustrated in FIG. 1A, 1B, 2, 3A, 3B, 4, or 5, for example.

With reference to FIG. 6, aspects of example process flow 600 are illustratively provided and provide a method for causing an artificial intelligence (AI)-based task to be performed by invalidating one or more data elements from conditional code of a forward conditional branch instruction, in accordance with an embodiment of the present disclosure. As illustrated, at block 602, example process flow 600 includes accessing an artificial intelligence (AI)-based task. At block 604, example process flow 600 includes determining that the AI-based task comprises a forward conditional branch instruction comprising conditional code and forward code defining a positive offset. At block 606, example process flow 600 includes determining that the forward conditional branch instruction is taken as part of executing the AI-based task. At block 608, example process flow 600 includes determining that the positive offset is less than or equal to an offset threshold value. At block 610, example process flow 600 includes invalidating one or more data elements from the conditional code and that correspond to the positive offset based on the positive offset being less than or equal to the offset threshold value and based on the forward conditional branch instruction being taken. At block 612, example process flow 600 includes executing the AI-based task subsequent to invalidating the one or more data elements.

With reference to FIG. 7, aspects of example process flow 700 are illustratively provided and provide a method for performing a task by invalidating one or more data elements from conditional code of a forward conditional branch instruction, in accordance with an embodiment of the present disclosure. As illustrated, at block 702, example process flow 700 includes accessing a task comprising a forward conditional branch instruction comprising conditional code and forward code defining a positive offset. At block 704, example process flow 700 includes determining that the forward conditional branch instruction is taken as part of executing the task. At block 706, example process flow 700 includes determining that the positive offset is less than or equal to an offset threshold value. At block 708, example process flow 700 includes invalidating, based on the positive offset being less than or equal to the offset threshold value and based on the forward conditional branch instruction being taken, one or more data elements from the conditional code and that correspond to the positive offset. At block 710, example process flow 700 includes, subsequent to invalidating the one or more data elements, continuing to execute the task.

With reference to FIG. 8, aspects of example process flow 800 are illustratively provided and provide a method for continuing to execute a task subsequent to invalidating one or more data elements from conditional code of a forward conditional branch instruction, in accordance with an embodiment of the present disclosure. As illustrated, at block 802, example process flow 800 includes accessing a task comprising a forward conditional branch instruction comprising conditional code and forward code defining a positive offset. At block 804, example process flow 800 includes determining that the forward conditional branch instruction is taken as part of executing the task. At block 806, example process flow 800 includes determining that the positive offset is less than or equal to an offset threshold value. At block 808, example process flow 800 includes, based on at least one of (1) the positive offset being less than or equal to the offset threshold value or (2) the forward conditional branch instruction being taken, generating computer code to invalidate one or more data elements from the conditional code and that correspond to the positive offset. At block 810, example process flow 800 includes continuing to execute the task subsequent to the one or more data elements being invalidated.

Example Reduction to Practice

An illustrative example embodiment of the present disclosure that has been reduced to practice is described herein. This example embodiment comprises a workload processing engine 210 (of FIG. 2), as described herein, implemented by a computing system executing certain tasks having forward conditional branch instructions. However, it should be noted that although this example reduction-to-practice focuses specifically on a specific implementation, embodiments of the technologies described herein are more generally applicable to any suitable processing device executing any suitable task or workflow.

With reference to FIGS. 1-5, and with continuing reference to process 600, 700, and 800 of FIGS. 6, 7, and 8, respectively, this example embodiment was constructed, tested, and verified as described below. In this example, a computing device was tasked with performing predictions using a Mixture-of-Experts (MoE) single instruction, multiple data (SIMD) kernel. As part of performing these predictions, the MoE SIMD kernel performed dispatch and combine operations while implementing the embodiments described herein to improve processing speed. For example, it was discovered that by invalidating data elements associated with the conditional code and that correspond to the positive offset (based on the positive offset being less than or equal to the threshold value and based on the forward conditional branch instruction being taken), processing speed decreased by 24%, as provided in Table 1.

TABLE 1

Performance improvements of an MoE SIMD kernel performed dispatch and combine operations

| | |
|---|---|
| Elements Per Row | 32 |
| Number of Rows | 64 |
| Total Branches | 80 |
| Total Forward Branches | 16 |
| Assume Half of the Forward Branch Mispredicts | 8 |
| Total Misprediction Penalty in Cycles for Forward Branches | 104 |
| Total Penalty with Forward Branch Optimization | 16 |
| Total Cycles without the Fix | 368 |
| Total Cycles with the Fix | 280 |
| Performance Improvement with the Forward Branch Optimization | 24% |

Thus, the workload processing engine 210 (of FIG. 2) was able to reduce processing time of performing certain complex tasks, as compared to existing approaches employing branch predictions.

In additional reductions to practice, a hardware dispatcher was employed to track dependencies even after the data elements (for example, the instructions) in the conditional code are invalidated. Additionally, certain state machine-implemented performance optimization modules are disabled if they are related to the conditional code. Branch instructions in the conditional code may cause updates to branch history registers and branch target buffers, even though they are invalidated; in one embodiment, a programmable field is provided to disable this feature in hardware components of a computing device implementing these embodiments. Additionally, a kill switch can be implemented as programmable software to disable the invalidation in certain contexts or AI task types. Alternatively, the kill switch can be implemented by programming an offset threshold value to zero. Other testing approaches were tested and implemented to achieve improvements to the technology described herein.

As the foregoing reduction to practice has illustrated, invalidating certain data elements associated with forward conditional branch instructions as performed in accordance with processes 600, 700, and 800 of FIGS. 6, 7, and 8, reduced processing speed. In this reduction to practice, processing speed was reduced and throughput was increased, thereby improving operation of a computer executing certain workloads and tasks.

Other Embodiments

In some embodiments, a system, such as the computerized system described in any of the embodiments above, comprises at least one computer processor; and at least one computer storage media storing computer-useable instructions that, when used by the at least one computer processor, cause the system to perform operations. The operations include accessing a computing task; determining that the computing task comprises a forward conditional branch instruction comprising conditional code and forward code defining a positive offset; determining that the forward conditional branch instruction is taken as part of executing the computing task; determining that the positive offset is less than or equal to an offset threshold value; invalidating one or more data elements from the conditional code and that correspond to the positive offset based on the positive offset being less than or equal to the offset threshold value and based on the forward conditional branch instruction being taken; and subsequent to invalidating the one or more data elements, executing the computing task.

In any combination of the above embodiments of the system, invalidating the one or more data elements prevents the one or more data elements from the conditional code from committing in a write-back stage of a pipeline associated with the computing task.

In any combination of the above embodiments of the system, invalidating the one or more data elements comprises reprogramming the data elements to no-operation (NOP) data elements.

In any combination of the above embodiments of the system, the offset threshold value is based on at least one of a branch misprediction penalty or a number of clock cycles associated with executing the conditional code.

In any combination of the above embodiments of the system, the branch misprediction penalty is indicative of time to recover to a correct path after a misprediction, wherein recovering to the correct path causes pipeline refill.

In any combination of the above embodiments of the system, the operations comprise determining, based on at least one feature of the computing task, a classification for the computing task, wherein the one or more data elements are invalidated for a computing task being of a first classification.

In any combination of the above embodiments of the system, the classification comprises an inference or training operation.

In any combination of the above embodiments of the system, the at least one processor comprises a Single Input, Multiple Data (SIMD) processor, wherein a source register or a destination register stores SIMD data.

Various embodiments are directed to computer-implemented methods comprising accessing a task comprising a forward conditional branch instruction comprising conditional code and forward code defining a positive offset; determining that the forward conditional branch instruction is taken as part of executing the task; determining that the positive offset is less than or equal to an offset threshold value; based on the positive offset being less than or equal to the offset threshold value and based on the forward conditional branch instruction being taken, invalidating one or more data elements from the conditional code and that correspond to the positive offset; and subsequent to invalidating the one or more data elements, continuing to execute the task.

In any combination of the above embodiments of the computer-implemented method, invalidating the one or more data elements causes the data elements from the conditional code to not be committed or written in a write-back stage of a pipeline associated with the task.

In any combination of the above embodiments of the computer-implemented method, invalidating the one or more data elements comprises reprogramming the one or more data elements to no-operation (NOP) data elements.

In any combination of the above embodiments of the computer-implemented method, the offset threshold value is based on at least one of a branch misprediction penalty or a number of clock cycles associated with executing the conditional code.

In any combination of the above embodiments of the computer-implemented method, the branch misprediction penalty is indicative of time wasted in fetching and decoding instructions from a wrong path, wherein fetching and decoding the instructions from the wrong path causes pipeline refill.

In any combination of the above embodiments of the computer-implemented method, the method further includes determining, based on at least one feature of the task, a classification for the task, wherein the one or more data elements are invalidated for the task being of a first classification or not invalidated for the task being of a second classification.

Various embodiments are directed to one or more computer storage media having computer-executable instructions embodied thereon that, when executed, by one or more processors, cause a computing system to perform operations. The operations include accessing a task comprising a forward conditional branch instruction comprising conditional code and forward code defining a positive offset; determining that the forward conditional branch instruction is taken as part of executing the task; determining that the positive offset is less than or equal to an offset threshold value; based on at least one of (1) the positive offset being less than or equal to the offset threshold value or (2) the forward conditional branch instruction being taken, generating computer code to invalidate one or more data elements from the conditional code and that correspond to the positive offset; and subsequent to the one or more data elements being invalidated, continuing to execute the task.

In any combination of the above embodiments of the one or more computer storage media, invalidating the one or more data elements prevents the data elements from the conditional code from committing in a write-back stage of a pipeline associated with the task.

In any combination of the above embodiments of the one or more computer storage media, invalidating the one or more data elements comprises reprogramming the data elements to no-operation (NOP) data elements.

In any combination of the above embodiments of the one or more computer storage media, invalidating the one or more data elements comprises executing at least one of a compiler intrinsic, a memory barrier, a spinlock, a halt instruction, or a delay loop.

In any combination of the above embodiments of the one or more computer storage media, the operations comprise determining a context associated with the forward conditional branch instruction.

In any combination of the above embodiments of the one or more computer storage media, the task comprises a neural network-based task.

Example Computing Environments

Figure 9:
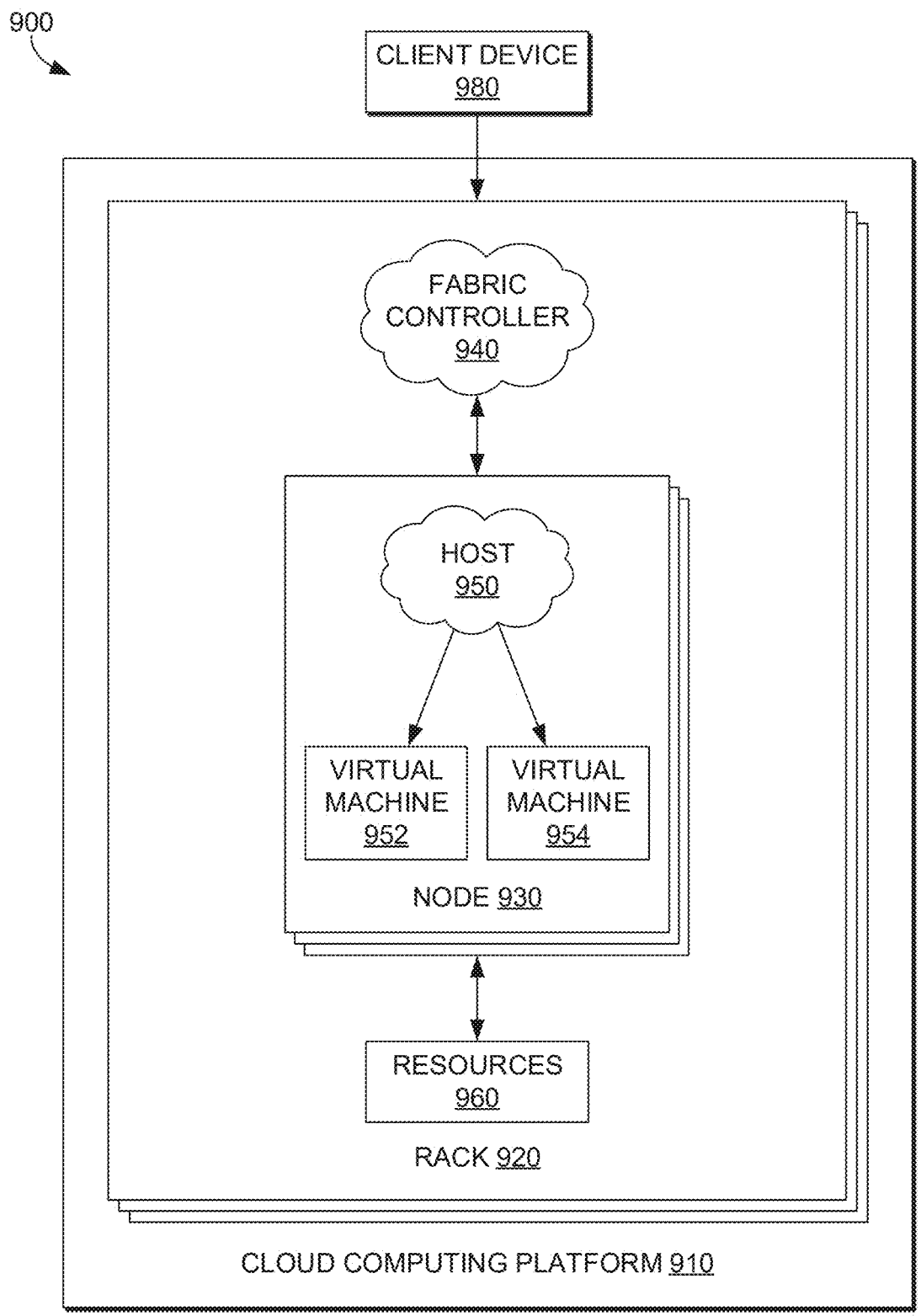
FIG. 9 is a block diagram of an example computing environment suitable for use in implementing an embodiment of the present disclosure.
Figure 10:
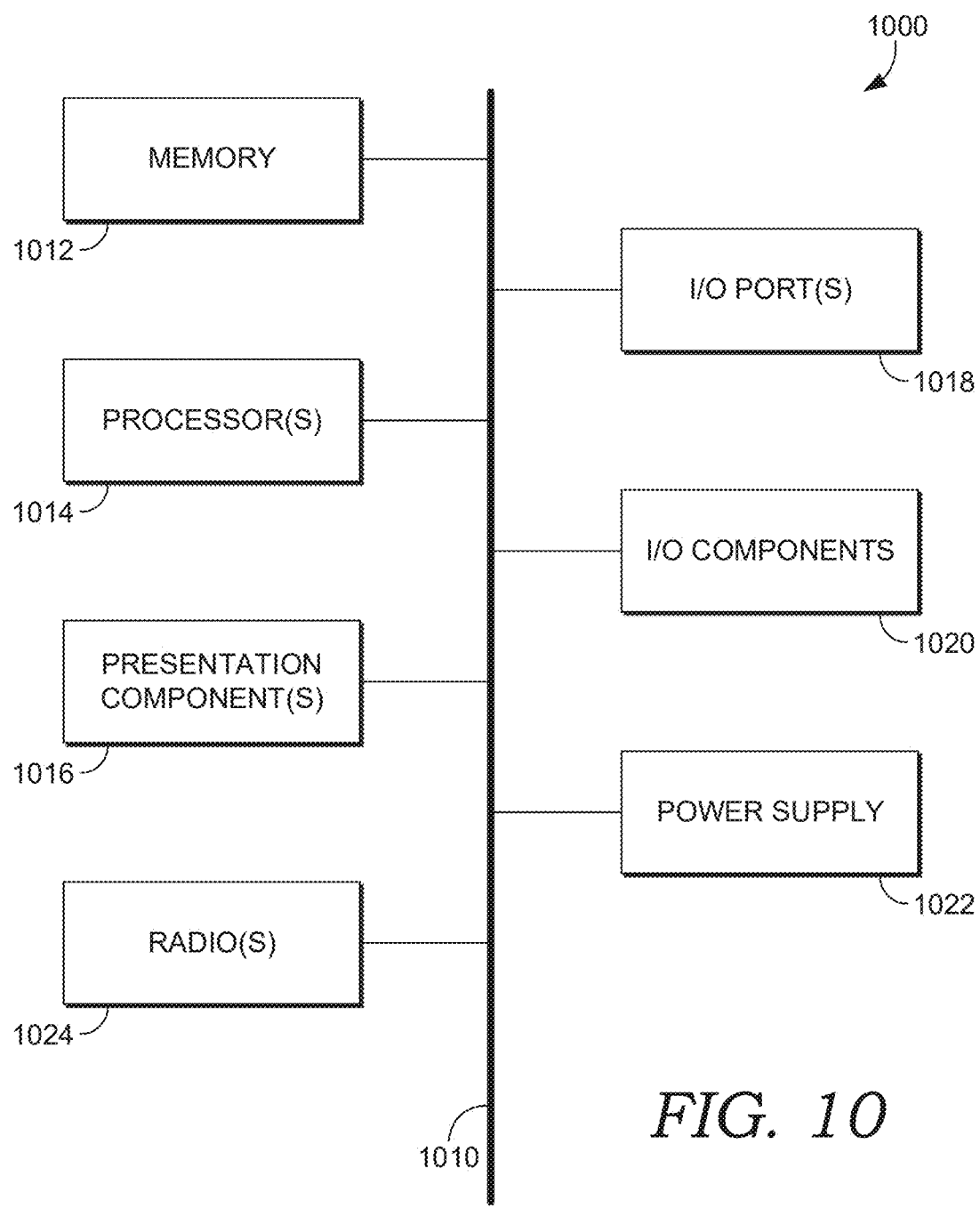
FIG. 10 is a block diagram of an example computing device suitable for use in implementing an embodiment of the present disclosure.

Having described various implementations, several example computing environments suitable for implementing embodiments of the disclosure are now described, including an example computing device and an example distributed computing environment in FIGS. 9 and 10, respectively. With reference to FIG. 10, an example computing device is provided and referred to generally as computing device 1000. The computing device 1000 is but one example of a suitable computing environment and is not intended to suggest any limitation as to the scope of use or functionality of embodiments of the disclosure, and nor should the computing device 1000 be interpreted as having any dependency or requirement relating to any one or combination of components illustrated.

Embodiments of the disclosure are described in the general context of computer code or machine-useable instructions, including computer-useable or computer-executable instructions, such as program modules, being executed by a computer or other machine such as a smartphone, a tablet personal computer (PC), or other mobile device, server, or client device. Generally, program modules, including routines, programs, objects, components, data structures, and the like, refer to code that performs particular tasks or implements particular abstract datatypes. Embodiments of the disclosure are practiced in a variety of system configurations, including mobile devices, consumer electronics, general-purpose computers, more specialty computing devices, or the like. Embodiments of the disclosure are also practiced in distributed computing environments where tasks are performed by remote-processing devices that are linked through a communications network. In a distributed computing environment, program modules may be located in both local and remote computer storage media, including memory storage devices.

Some embodiments comprise an end-to-end software-based system that operates within system components described herein to operate computer hardware to provide system functionality. At a low level, hardware processors generally execute instructions selected from a machine language (also referred to as machine code or native) instruction set for a given processor. The processor recognizes the native instructions and performs corresponding low-level functions related to, for example, logic, control, and memory operations. Low-level software written in machine code can provide more complex functionality to higher level software. Accordingly, in some embodiments, computer-executable instructions include any software, including low-level software written in machine code, higher level software such as application software, and any combination thereof. In this regard, the system components can manage resources and provide services for system functionality. Any other variations and combinations thereof are contemplated within the embodiments of the present disclosure.

Referring now to FIG. 9, an example distributed computing environment 900 is illustratively provided, in which implementations of the present disclosure can be employed. In particular, FIG. 9 shows a high-level architecture of an example cloud computing platform 910 that can host a technical solution environment or a portion thereof (for example, a data trustee environment). It should be understood that this and other arrangements described herein are set forth only as examples. For example, as described above, many of the elements described herein are implemented as discrete or distributed components or in conjunction with other components, and in any suitable combination and location. Other arrangements and elements (for example, machines, interfaces, functions, orders, and groupings of functions) can be used in addition to or instead of those shown.

Data centers can support distributed computing environment 900 that includes cloud computing platform 910, rack 920, and node 930 (for example, computing devices, processing units, or blades) in rack 920. The technical solution environment can be implemented with cloud computing platform 910, which runs cloud services across different data centers and geographic regions. Cloud computing platform 910 can implement the fabric controller 940 component for provisioning and managing resource allocation, deployment, upgrade, and management of cloud services. Typically, cloud computing platform 910 acts to store data or run service applications in a distributed manner. Cloud computing platform 910 in a data center can be configured to host and support operation of endpoints of a particular service application. In one example, the cloud computing platform 910 is a public cloud, a private cloud, or a dedicated cloud.

Node 930 can be provisioned with host 950 (for example, operating system or runtime environment) running a defined software stack on node 930. In one example, a "node" refers to a physical computer system with a distinct host internet protocol (IP) address that is running one or more application servers. Node 930 can also be configured to perform specialized functionality (for example, computer nodes or storage nodes) within cloud computing platform 910. Node 930 is allocated to run one or more portions of a service application of a tenant. A tenant can refer to a customer utilizing resources of cloud computing platform 910. Service application components of cloud computing platform 910 that support a particular tenant can be referred to as a multitenant infrastructure or tenancy. The terms "service application," "application," or "service" are used interchangeably with regards to FIG. 9, and broadly refer to any software, or portions of software, that run on top of, or access storage and computing device locations within, a datacenter.

When more than one separate service application is being supported by nodes 930, certain nodes 930 are partitioned into virtual machines (for example, virtual machine 952 and virtual machine 954). Physical machines can also concurrently run separate service applications. The virtual machines or physical machines can be configured as individualized computing environments that are supported by resources 960 (for example, hardware resources and software resources) in cloud computing platform 910. It is contemplated that resources can be configured for specific service applications. Further, each service application may be divided into functional portions such that each functional portion is able to run on a separate virtual machine. In cloud computing platform 910, multiple servers may be used to run service applications and perform data storage operations in a cluster. In one embodiment, the servers perform data operations independently but exposed as a single device, referred to as a cluster. Each server in the cluster can be implemented as a node.

In some embodiments, client device 980 is linked to a service application in cloud computing platform 910. Client device 980 may be any type of computing device, and the client device 980 can be configured to issue commands to cloud computing platform 910. In embodiments, client device 980 communicates with service applications through a virtual Internet Protocol (IP) and load balancer or other means that direct communication requests to designated endpoints in cloud computing platform 910. Certain components of cloud computing platform 910 communicate with each other over a network (not shown), which includes, without limitation, one or more local area networks (LANs) and/or wide area networks (WANs).

With reference to FIG. 10, computing device 1000 includes a bus 1010 that directly or indirectly couples the following devices: memory 1012, one or more processors 1014, one or more presentation components 1016, one or more input/output (I/O) ports 1018, one or more I/O components 1020, and an illustrative power supply 1022. In one example, bus 1010 represents one or more buses (such as an address bus, data bus, or combination thereof). Although the various blocks of FIG. 10 are shown with lines for the sake of clarity, in reality, these blocks represent logical, not necessarily actual, components. For example, a presentation component includes a display device, such as an I/O component. Also, processors have memory. The inventors hereof recognize that such is the nature of the art and reiterate that the diagram of FIG. 10 is merely illustrative of an example computing device that can be used in connection with one or more embodiments of the present disclosure. Distinction is not made between such categories as "workstation," "server," "laptop," or "handheld device," as all are contemplated within the scope of FIG. 10 and with reference to "computing device."

Computing device 1000 typically includes a variety of computer-readable media. Computer-readable media can be any available media that can be accessed by computing device 1000 and includes both volatile and non-volatile, removable and non-removable media. By way of example, and not limitation, computer-readable media comprises computer storage media and communication media. Computer storage media includes both volatile and non-volatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory or other memory technology, CD-ROM, digital versatile disks (DVDs) or other optical disk storage, magnetic cassettes, magnetic tape, magnetic disk storage or other magnetic storage devices, or any other medium that can be used to store the desired information and which can be accessed by computing device 1000. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner so as to encode information in the signal. By way of example, and not limitation, communication media includes wired media, such as a wired network or direct-wired connection, and wireless media, such as acoustic, radio frequency (RF), infrared, and other wireless media. Combinations of any of the above should also be included within the scope of computer-readable media.

Memory 1012 includes computer storage media in the form of volatile and/or non-volatile memory. In one example, the memory is removable, non-removable, or a combination thereof. Hardware devices include, for example, solid-state memory, hard drives, and optical-disc drives. Computing device 1000 includes one or more processors 1014 that read data from various entities such as memory 1012 or I/O components 1020. As used herein and in one example, the term "processor," "processing unit," or "a processer" refers to more than one computer processor. For example, the term processor (or "a processor") refers to at least one processor, which may be a physical or virtual processor, such as a computer processor on a virtual machine. The term processor (or "a processor") also may refer to a plurality of processors, each of which may be physical or virtual, such as a multiprocessor system, distributed processing or distributed computing architecture, a cloud computing system, or parallel processing by more than a single processor. Further, various operations described herein as being executed or performed by a processor are performed by more than one processor.

Presentation component(s) 1016 presents data indications to a user or other device. Presentation components include, for example, a display device, speaker, printing component, vibrating component, and the like.

The I/O ports 1018 allow computing device 1000 to be logically coupled to other devices, including I/O components 1020, some of which are built-in. Illustrative components include a microphone, joystick, game pad, satellite dish, scanner, printer, or a wireless device. The I/O components 1020 can provide a natural user interface (NUI) that processes air gestures, voice, or other physiological inputs generated by a user. In some instances, inputs are transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1000. In one example, the computing device 1000 is equipped with depth cameras, such as stereoscopic camera systems, infrared camera systems, red-green-blue (RGB) camera systems, and combinations of these, for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

Some embodiments of computing device 1000 include one or more radio(s) 1024 (or similar wireless communication components). The radio transmits and receives radio or wireless communications. Example computing device 1000 is a wireless terminal adapted to receive communications and media over various wireless networks. Computing device 1000 may communicate via wireless protocols, such as code-division multiple access ("CDMA"), Global System for Mobile ("GSM") communication, or time-division multiple access ("TDMA"), as well as others, to communicate with other devices. In one embodiment, the radio communication is a short-range connection, a long-range connection, or a combination of both a short-range and a long-range wireless telecommunications connection. When referring to "short" and "long" types of connections, certain embodiments do not refer to the spatial relation between two devices. Instead, certain embodiments generally refer to short range and long range as different categories, or types, of connections (for example, a primary connection and a secondary connection). A short-range connection includes, by way of example and not limitation, a Wi-Fi® connection to a device (for example, mobile hotspot) that provides access to a wireless communications network, such as a wireless local area network (WLAN) connection using the 802.11 protocol; a Bluetooth connection to another computing device is a second example of a short-range connection, or a near-field communication connection. A long-range connection may include a connection using, by way of example and not limitation, one or more of code-division multiple access (CDMA), General Packet Radio Service (GPRS), Global System for Mobile Communication (GSM), time-division multiple access (TDMA), and 802.16 protocols.

Example computing devices 1000 comprise any type of computing device capable of use by a user, such as a personal computer (PC), a laptop computer, a mobile device, a smartphone, a smart speaker, a tablet computer, a smart watch, a wearable computer, a personal digital assistant (PDA) device, a virtual-reality (VR) or augmented-reality (AR) device or headset, music player or a Music Player 3 (MP3) player, a global positioning system (GPS) device, a video player, a handheld communication device, a gaming device or system, an entertainment system, a vehicle computer system, an embedded system controller, a camera, a remote control, an appliance, a consumer electronic device, a workstation, any other suitable computer device, or any combination of these delineated devices.

Additional Structural and Functional Features of Embodiments of Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (for example, machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

For purposes of this disclosure, the word "including" has the same broad meaning as the word "comprising," and the word "accessing" comprises "receiving," "referencing," or "retrieving." Furthermore, the word "communicating" has the same broad meaning as the word "receiving" or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

As used herein, the term "set" may be employed to refer to an ordered (i.e., sequential) or an unordered (i.e., non-sequential) collection of objects (or elements), such as machines (for example, computer devices), physical and/or logical addresses, graph nodes, graph edges, functionalities, and the like. As used herein, a set may include N elements, where N is any positive integer. That is, a set may include 1, 2, 3, . . . . N objects and/or elements, where N is a positive integer with no upper bound. Therefore, as used herein, a set does not include a null set (i.e., an empty set), that includes no elements (for example, N=0 for the null set). A set may include only a single element. In other embodiments, a set may include a number of elements that is significantly greater than one, two, three, or billions of elements. A set may be an infinite set or a finite set. The objects included in some sets may be discrete objects (for example, the set of natural numbers N). The objects included in other sets may be continuous objects (for example, the set of real numbers R). In some embodiments, "a set of objects" that is not a null set of the objects may be interchangeably referred to as either "one or more objects" or "at least one object," where the term "object" may stand for any object or element that may be included in a set. Accordingly, the phrases "one or more objects" and "at least one object" may be employed interchangeably to refer to a set of objects that is not the null or empty set of objects. A set of objects that includes at least two of the objects may be referred to as "a plurality of objects."

As used herein and in one example, the term "subset," is a set that is included in another set. A subset may be, but is not required to be, a proper or strict subset of the other set that the subset is included within. That is, if set B is a subset of set A, then in some embodiments, set B is a proper or strict subset of set A. In other embodiments, set B is a subset of set A, but not a proper or a strict subset of set A. For example, set A and set B may be equal sets, and set B may be referred to as a subset of set A. In such embodiments, set A may also be referred to as a subset of set B. Two sets may be disjointed sets if the intersection between the two sets is the null set.

In one example, a "workload" (also referred to herein in one example as "tasks," "jobs," or "workflow") refers to a series or collection of activities or computations associated with completing a task. In one example, a "workload" is also referred to as a "job," a "task," a "set of jobs," or a "set of tasks." An example AI-based workload includes aspects of raw data processing, featurization, training, inference, and deployment. In some embodiments, the workload from user accounts is classified based on the job type and the deployment type. In one example, the job type refers to the task classification and includes any suitable classification such as "basic," "standard," and/or "premium," as defined by a service-level agreement (SLA).

In one example, an "accelerator," "processor," or "coprocessor" can be used interchangeably to refer to a piece of hardware utilized in a data center and used to run a virtual machine and/or execute a workload that includes certain tasks, such as AI-based tasks, for example, associated with an LLM. In one example, the term "coprocessor" or "accelerator" excludes central processing units (CPUs) and includes components that work in conjunction with the CPUs, such as a graphics processing unit (GPU), a field-programmable gate array (FPGA), an application-specific integrated circuit (ASIC), a Single Input, Multiple Data (SIMD) processor, or a tensor processing unit ("TPU"), among other suitable processing hardware devices.

As used herein, the terms "application" or "app" may be employed interchangeably to refer to any software-based program, package, or product that is executable via one or more (physical or virtual) computing machines or devices. An application may be any set of software products that, when executed, provide an end user one or more computational and/or data services. In some embodiments, an application may refer to a set of applications that may be executed together to provide the one or more computational and/or data services. The applications included in a set of applications may be executed serially, in parallel, or any combination thereof. The execution of multiple applications (comprising a single application) may be interleaved. For example, an application may include a first application and a second application. An execution of the application may include the serial execution of the first and second application or a parallel execution of the first and second applications. In other embodiments, the execution of the first and second application may be interleaved.

For purposes of a detailed discussion above, embodiments of the present disclosure are described with reference to a computing device or a distributed computing environment; however, the computing device and distributed computing environment depicted herein are non-limiting examples. Moreover, the terms computer system and computing system may be used interchangeably herein, such that a computer system is not limited to a single computing device, nor does a computing system require a plurality of computing devices. Rather, various aspects of the embodiments of this disclosure may be carried out on a single computing device or a plurality of computing devices, as described herein. Additionally, components can be configured for performing novel aspects of embodiments, where the term "configured for" can refer to "programmed to" perform particular tasks or implement particular abstract datatypes using code. Further, while embodiments of the present disclosure may generally refer to the technical solution environment and the schematics described herein, it is understood that the techniques described may be extended to other implementation contexts.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A system, comprising:
   at least one computer processor; and
   at least one computer storage media storing computer-useable instructions that, when used by the at least one computer processor, cause the system to perform operations comprising:
   accessing a computing task;
   determining that the computing task comprises a forward conditional branch instruction comprising conditional code and forward code defining a positive offset;
   determining that the forward conditional branch instruction is taken as part of executing the computing task;
   determining that the positive offset is less than or equal to an offset threshold value;
   based on the positive offset being less than or equal to the offset threshold value and based on the forward conditional branch instruction being taken, invalidating one or more data elements from the conditional code and that correspond to the positive offset; and subsequent to invalidating the one or more data elements, executing the computing task.

2. The system of claim 1, wherein invalidating the one or more data elements prevents the one or more data elements from the conditional code from committing in a write-back stage of a pipeline associated with the computing task.

3. The system of claim 1, wherein invalidating the one or more data elements comprises reprogramming the data elements to no-operation (NOP) data elements.

4. The system of claim 1, wherein the offset threshold value is based on at least one of a branch misprediction penalty or a number of clock cycles associated with executing the conditional code.

5. The system of claim 4, wherein the branch misprediction penalty is indicative of time to recover to a correct path after a misprediction, wherein recovering to the correct path causes pipeline refill.

6. The system of claim 1, wherein the operations comprise determining, based on at least one feature of the computing task, a classification for the computing task, wherein the one or more data elements are invalidated for a computing task being of a first classification.

7. The system of claim 6, wherein the classification comprises an inference or training operation.

8. The system of claim 1, wherein the at least one processor comprises a Single Input, Multiple Data (SIMD) processor, wherein a source register or a destination register stores SIMD data.

9. A computer-implemented method, comprising:
accessing a task comprising a forward conditional branch instruction comprising conditional code and forward code defining a positive offset;
determining that the forward conditional branch instruction is taken as part of executing the task;
determining that the positive offset is less than or equal to an offset threshold value;
based on the positive offset being less than or equal to the offset threshold value and based on the forward conditional branch instruction being taken, invalidating one or more data elements from the conditional code and that correspond to the positive offset; and
subsequent to invalidating the one or more data elements, continuing to execute the task.

10. The computer-implemented method of claim 9, wherein invalidating the one or more data elements causes the data elements from the conditional code to not be committed or written in a write-back stage of a pipeline associated with the task.

11. The computer-implemented method of claim 9, wherein invalidating the one or more data elements comprises reprogramming the one or more data elements to no-operation (NOP) data elements.

12. The computer-implemented method of claim 9, wherein the offset threshold value is based on at least one of a branch misprediction penalty or a number of clock cycles associated with executing the conditional code.

13. The computer-implemented method of claim 12, wherein the branch misprediction penalty is indicative of time wasted in fetching and decoding instructions from a wrong path, wherein fetching and decoding the instructions from the wrong path causes pipeline refill.

14. The computer-implemented method of claim 9, further comprising determining, based on at least one feature of the task, a classification for the task, wherein the one or more data elements are invalidated for the task being of a first classification or not invalidated for the task being of a second classification.

15. One or more computer storage media having computer-executable instructions embodied thereon that, when executed by one or more processors, cause a computing system to perform operations comprising:
accessing a task comprising a forward conditional branch instruction comprising conditional code and forward code defining a positive offset;
determining that the forward conditional branch instruction is taken as part of executing the task;
determining that the positive offset is less than or equal to an offset threshold value;
based on at least one of (1) the positive offset being less than or equal to the offset threshold value or (2) the forward conditional branch instruction being taken, generating computer code to invalidate one or more data elements from the conditional code and that correspond to the positive offset; and
subsequent to the one or more data elements being invalidated, continuing to execute the task.

16. The one or more computer storage media of claim 15, wherein invalidating the one or more data elements prevents the data elements from the conditional code from committing in a write-back stage of a pipeline associated with the task.

17. The one or more computer storage media of claim 15, wherein invalidating the one or more data elements comprises reprogramming the data elements to no-operation (NOP) data elements.

18. The one or more computer storage media of claim 15, wherein invalidating the one or more data elements comprises executing at least one of a compiler intrinsic, a memory barrier, a spinlock, a halt instruction, or a delay loop.

19. The one or more computer storage media of claim 15, wherein the operations comprise determining a context associated with the forward conditional branch instruction.

20. The one or more computer storage media of claim 15, wherein the task comprises a neural network-based task.

* * * * *